(12) United States Patent
Ghafourifar et al.

(10) Patent No.: US 10,395,047 B2
(45) Date of Patent: *Aug. 27, 2019

(54) SYSTEM AND METHOD OF APPLYING MULTIPLE ADAPTIVE PRIVACY CONTROL LAYERS TO SINGLE-LAYERED MEDIA FILE TYPES

(71) Applicant: Entefy Inc., Palo Alto, CA (US)

(72) Inventors: Alston Ghafourifar, Los Altos Hills, CA (US); Philip Nathan Greenberg, San Diego, CA (US)

(73) Assignee: Entefy Inc., Palo Alto, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/396,479

(22) Filed: Dec. 31, 2016

(65) Prior Publication Data

US 2018/0189504 A1 Jul. 5, 2018

(51) Int. Cl.
*G06F 21/62* (2013.01)
*G06F 21/60* (2013.01)
*G06F 16/182* (2019.01)

(52) U.S. Cl.
CPC ........ *G06F 21/6209* (2013.01); *G06F 16/182* (2019.01); *G06F 21/602* (2013.01); *G06F 21/629* (2013.01)

(58) Field of Classification Search
CPC .... G06F 21/6209; G06F 21/602; G06F 17/30; H04L 9/3268
See application file for complete search history.

(56) References Cited

U.S. PATENT DOCUMENTS

| 6,067,399 | A | 5/2000 | Berger |
| 8,196,182 | B2 | 6/2012 | Sussland |
| 8,744,143 | B2 * | 6/2014 | Chen .................. G06F 21/6245 348/143 |
| 8,799,022 | B1 | 8/2014 | O'Brien |
| 9,264,581 | B2 | 2/2016 | Lerios |
| 9,350,914 | B1 | 5/2016 | Kaur |
| 9,426,387 | B2 | 8/2016 | Jung |

(Continued)

OTHER PUBLICATIONS

Goyal, et al., "Attribute-Based Encryption for Fine-Grained Access Control of Encrypted Data," '06, Oct. 30-Nov. 3, 2006, Alexandria, Virginia, USA.

*Primary Examiner* — Wasika Nipa
(74) *Attorney, Agent, or Firm* — Blank Rome LLP

(57) ABSTRACT

Users desire a communications system that allows the users to apply customized privacy settings (and, optionally, encryption keys) differently to particular portions of a document—even if the document is of a 'lossy' file type, e.g., a JPEG image. The custom access permission settings may be implemented by obfuscating portions of the original file and then embedding "secret," e.g., hidden and/or encrypted, versions of the obfuscated portions in parts of the data structure of the original lossy file in the form of "layers" (e.g., the bit-equivalent of PNG layers). The individual encrypted layers may then be decrypted according to each recipient's permissions and layered on top of the original lossy file 'in memory' before being displayed to the recipient. The use of multiple encrypted layers allows for the visual revelation of the content of the original lossy file without modifying the actual underlying image content of the original lossy file.

23 Claims, 14 Drawing Sheets

(56) References Cited

U.S. PATENT DOCUMENTS

| | | |
|---|---|---|
| 9,571,785 B2 | 2/2017 | Farrell |
| 9,590,949 B2 | 3/2017 | Murphy |
| 9,646,398 B2 | 5/2017 | Yuan |
| 9,749,321 B2 | 8/2017 | Farnsworth |
| 9,798,889 B1 | 10/2017 | Karpel |
| 2001/0055396 A1 | 12/2001 | Jevans |
| 2002/0078361 A1* | 6/2002 | Giroux ............... H04L 63/0428 713/183 |
| 2003/0105719 A1* | 6/2003 | Berger ............... G06F 21/6245 705/51 |
| 2003/0108240 A1 | 6/2003 | Gutta |
| 2005/0002585 A1 | 1/2005 | Brauckmann |
| 2005/0066265 A1 | 3/2005 | Kotler |
| 2006/0017747 A1* | 1/2006 | Dawson ............... G06Q 20/085 345/629 |
| 2008/0140578 A1 | 6/2008 | Felt |
| 2008/0193018 A1 | 8/2008 | Masuda |
| 2008/0267403 A1* | 10/2008 | Boult ................ H04L 9/0894 380/255 |
| 2009/0207269 A1 | 8/2009 | Yoda |
| 2009/0244364 A1 | 10/2009 | Nonogaki |
| 2010/0103193 A1 | 4/2010 | Abe |
| 2010/0246890 A1 | 9/2010 | Ofek |
| 2011/0150217 A1 | 6/2011 | Kim |
| 2013/0011068 A1 | 1/2013 | Albouyeh |
| 2013/0024901 A1 | 1/2013 | Sharif-Ahmadi |
| 2013/0093829 A1 | 4/2013 | Rosenblatt |
| 2013/0156263 A1 | 6/2013 | Yamashita |
| 2013/0202109 A1 | 8/2013 | Ducharme |
| 2014/0112534 A1 | 4/2014 | Sako |
| 2014/0189483 A1 | 7/2014 | Awan |
| 2015/0006390 A1 | 1/2015 | Aissi |
| 2015/0016602 A1* | 1/2015 | de los Reyes ........... G09C 5/00 380/28 |
| 2015/0033362 A1 | 1/2015 | Mau |
| 2015/0113661 A1 | 4/2015 | Mishra |
| 2015/0371049 A1 | 12/2015 | Xavier |
| 2015/0371613 A1 | 12/2015 | Patel |
| 2016/0034704 A1 | 2/2016 | Shim |
| 2016/0217300 A1 | 7/2016 | Kim |
| 2016/0241627 A1 | 8/2016 | Ortega |
| 2016/0283096 A1 | 9/2016 | Yao |
| 2016/0292494 A1 | 10/2016 | Ganong |
| 2016/0294781 A1* | 10/2016 | Ninan ................ H04L 63/0407 |
| 2016/0316219 A1 | 10/2016 | Yuan |
| 2017/0061155 A1 | 3/2017 | Gordon |
| 2017/0220816 A1 | 8/2017 | Matusek |
| 2018/0124055 A1 | 5/2018 | Chen |

\* cited by examiner

SYSTEM AND METHOD OF APPLYING MULTIPLE ADAPTIVE PRIVACY CONTROL LAYERS TO SINGLE-LAYERED MEDIA FILE TYPES

CROSS-REFERENCE TO RELATED APPLICATIONS

This application is related to U.S. patent application Ser. No. 14/986,072, filed Dec. 31, 2015, entitled "System And Method of Applying Adaptive Privacy Controls to Lossy File Types" ("the '072 application") and U.S. patent application Ser. No. 14/584,329, filed Dec. 29, 2014, entitled "System And Method of Determining User-Defined Permissions Through A Network" ("the '329 application"). The '072 and '329 applications are hereby incorporated by reference in their entireties.

TECHNICAL FIELD

This disclosure relates generally to systems, methods, and computer readable media for applying user-defined access permission settings to files in lossy file formats, those files may then be disseminated over a network. More particularly, the access permission settings may be implemented by embedding one or more "secret," e.g., hidden and/or encrypted, information portions in such lossy file formats in the form of layers.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, etc.) has led to increased concerns regarding the safety and security of documents and messages that are sent over networks. Users desire a system that provides for the setting of custom, e.g., user-defined, access permissions for a lossy file or part of the lossy file that comprises less than the entire file through a communications network. A 'lossy' file, as used herein, refers to a file (or file format) that is compressed using inexact approximation methods (e.g., partial data discarding methods). As such, lossy compression techniques may be used to reduce data size for storage, handling, and transmitting content. However, because lossy compression reduces a file by permanently discarding certain information (e.g., redundant information), when the file is decompressed, it is not decompressed to 100% of the original. Lossy compression is generally used for multimedia files, e.g., images files, such as JPEG files, video files, and/or sound files—where a certain amount of information loss will not be detected by most users and can result in significant gains in file size reduction or performance.

Certain lossy file types may also be described as "single-layered." For example, in the case of a JPEG image, all the image content information may be stored in the form of a "byte array." In order to change the appearance (e.g., color) of any pixels in the JPEG image, an editing or modification tool would need to modify or replace the particular information in the byte array corresponding to the region of pixels that are to be changed. Thus, the image data is said to be stored in a "single layer," as there is no way to 'cover' certain pixel regions in the JPEG image by simply adding an additional layer of pixel information over the top of the original pixel information. By contrast, more complex image file types that support multiple image layers, e.g., PNG images, offer the ability to store image information in distinct layers which may, e.g., be 'stacked' in different orders, individually adjusted for opacity/transparency, or individually moved, rotated, shown, hidden, etc. before composition and display to a viewer. Due to the use of multiple layers, these changes to the image may be made and/or 'unmade' without undoing, overwriting, or otherwise degrading the quality of any of the underlying image information in a layer that happens to be currently not shown to the viewer.

Lossy files may also contain multiple "header" properties. These header properties may be used to store alternate contents such as metadata, random information, or even full encoding of other files or portions of files, such as in the embodiments described herein. Such a system would allow customized privacy settings to be specified for different recipients, e.g., recipients at various levels of social distance from the user sending the document or message (e.g., public, private, followers, groups, Level-1 contacts, Level-2 contacts, Level-3 contacts, etc.). Such a system may also allow the user to apply customized privacy settings and encryption keys differently to particular parts of a lossy file, e.g., making one or more parts of the lossy file available only to a first class of users, or by making other parts of the lossy file available to the first class of users and a second class of users, all while preventing access to parts of lossy file by users who do not have the requisite access privileges.

Thus, a system for providing access permission setting through Adaptive Privacy Controls (APC) is described herein. APC, as used herein, will refer to a user-controllable or system-generated, intelligent privacy system that can limit viewing, editing, and re-sharing privileges for lossy files, for example, image files and other multimedia files that include a lossy compression (including single-layered multimedia file types), wherein changes made to the content of such 'lossy' files may not be reliably reversed or dynamically changed—as would be necessary according to prior art techniques attempting to implement the kinds of fine-grained access permission setting methods disclosed herein. Other embodiments of APC systems will, of course, be able to handle the setting of access permissions for recipients of lossless file formats, as well. In summary, APC systems, as used herein, allow users to share whatever information they want with whomever they want, while keeping others from accessing the same information, e.g., via hiding and/or encryption processes that can be initiated by user command or via system intelligence, even on lossy file types, and even when more than one region (including overlapping regions) in a multimedia file have been selected by a user for APC-style protection. APC access permission settings may be applied to individuals, pre-defined groups, and/or ad-hoc groups. Customized encryption keys may further be applied to particular parties or groups of parties to enhance the security of the permission settings.

APC may be used to apply privacy settings to only particular portions of a lossy file, for example, a particular portion of a JPEG image. For example, User A may be a family member who may be authorized to see an entire JPEG image, but User B and other users may be mere acquaintances, who are only authorized to see a redacted portion or portions of the JPEG image. For example, the entire JPEG image file would be viewable to User A, but only a redacted portion or portions of the JPEG image (e.g., everything but the face of the subject(s) in the image) would be available to the User B and other users when viewing the JPEG image file in an authorized viewing application.

According to some embodiments disclosed herein, a standard, i.e., "unauthorized," JPEG viewing application would also be able to open the redacted version of the JPEG image file; it simply would not "know" where to look within the JPEG image file for the "true" content from the redacted portion or portions of the JPEG image file. According to still other embodiments, even if an unauthorized JPEG viewing application were able to find the "true" content from the redacted portion or portions "hidden" within the file structure of the JPEG image, the redacted portion or portions may be encrypted, and the unauthorized JPEG viewing application would not possess the necessary decryption keys to decrypt the encrypted redacted portion or portions. Moreover, the unauthorized JPEG viewing application also would not know where to "place" the encrypted portion or portions back within the image to reconstruct the original, i.e., unredacted, JPEG image in a seamless fashion.

Thus, according to some embodiments, the network-based, user-defined, APC controls for lossy file types or files (e.g., single-layered images) may include access permission systems, methods, and computer readable media that provide a seamless, intuitive user interface (e.g., using touch gestures or mouse input) allowing a user to: "block out" particular portions or areas of interest in a lossy file; hide (and optionally encrypt) such "blocked out" portions within parts the lossy file's data structure; and then send the lossy file to particular recipients or groups of recipients with customized access permission settings, which settings may be specified on a per-recipient basis and that either allow or do not allow a given recipient to locate the hidden portions and (if necessary) decrypt such hidden portions so that the original lossy file may be reconstructed by the recipient without degradation to the original file's quality.

DETAILED DESCRIPTION

Figure 1A:
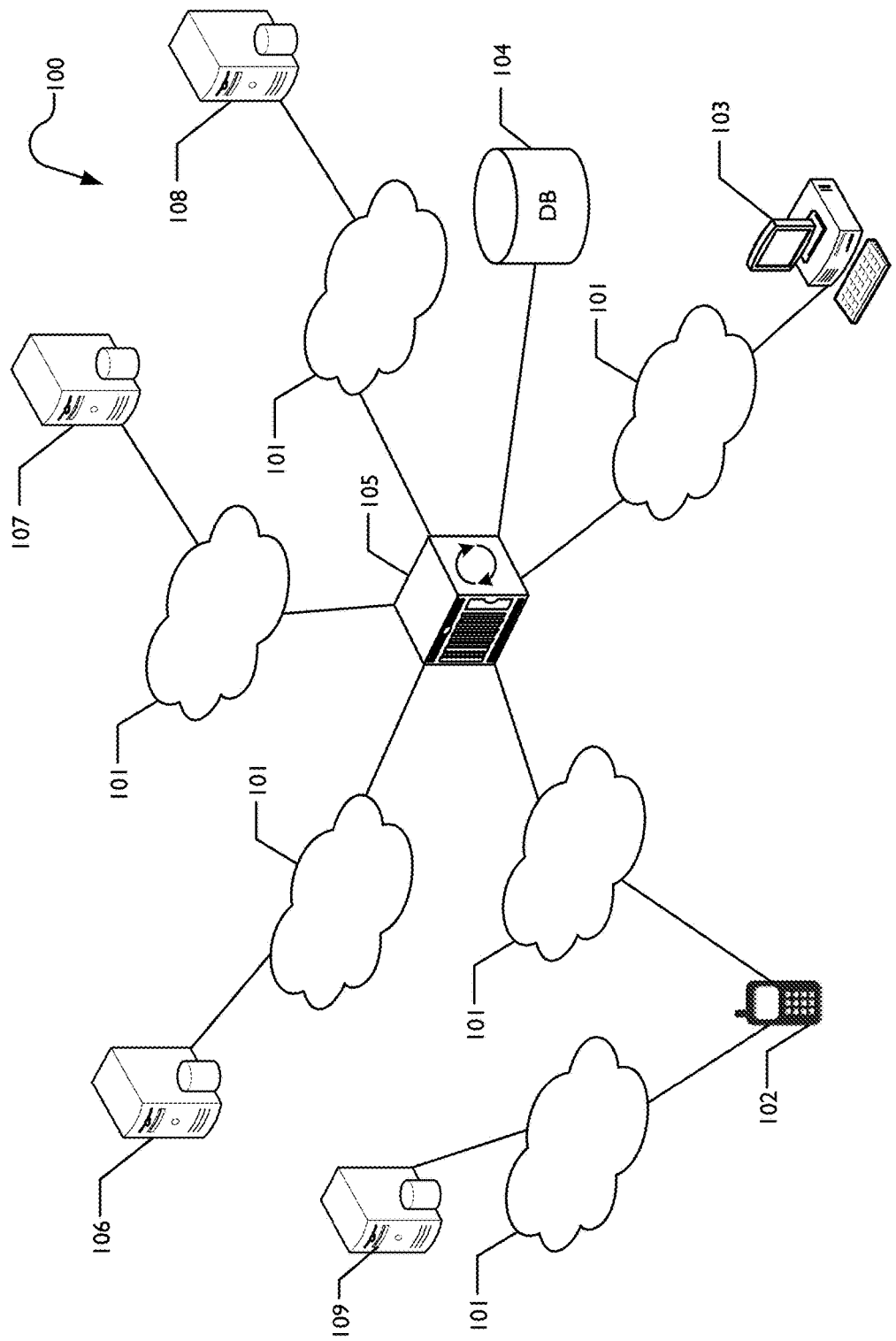
FIG. 1A is a block diagram illustrating a server-entry point network architecture infrastructure, according to one or more disclosed embodiments.

Disclosed are systems, methods and computer readable media for creating user-defined custom access permission settings for files stored in lossy file types, e.g., single-layered images such as JPEG images, which settings may serve to limit the viewing and/or sharing privileges for the files (or portions of the files) on a per-recipient basis. More particularly, but not by way of limitation, this disclosure relates to systems, methods, and computer readable media to permit users of the access permission setting system to redact certain content which corresponds to particular portions of the lossy file and then "hide" (and optionally encrypt) the redacted content within one or more parts of the data structure of the lossy file type. The recipient receiving the lossy file may then, if an authorized recipient and using an authorized viewing application, locate the hidden content within the file, decrypt the hidden content (if necessary), and then seamlessly reconstruct the content of the lossy file in its original form.

In the case of an original file of a single-layered image file type that has been protected with APC permission settings, each of the one or more protected portions of the original file may be extracted from the original file and then converted 'in memory' into a single image layer (unless multiple layers are otherwise necessary for some additional purpose) of a multi-layered image file type (e.g., a PNG layer), e.g., having a transparent region around the protected portion that is co-extensive in scope with the original file so that it may be properly aligned with the original file. [It is noted that the use of a PNG layer here is merely exemplary, and that other file types supporting multi-layers for the type of multimedia file being protected may also be selected.] Next, each layer created 'in memory' may be decrypted (i.e., if the extracted portion was encrypted by the protector, and if the recipient of the file is authorized to decrypt the particular portion), and layered on top of the original file's content at the appropriate position, such that the protected portion of the original file is visible to the viewer, but without actually altering the underlying image content (e.g., byte array) or file type of the original single-layered image file.

In some embodiments, the underlying image content of the original single-layered image file may also be converted 'in memory' to a multi-layered image file type (e.g., a PNG layer), so that all of the image content may be handled in a consistent manner in memory for viewing by a user, e.g., in an authorized viewing application. As may now be understood, when viewed outside of an authorized viewing application (or by a recipient that is not authorized to decrypt any of the protection portions), the viewer will simply see the original single-layered image file, which will have been compressed with the protected portions being obfuscated, such that the viewer either cannot view the protected portions or can only view distorted versions of the protected portions, as will be discussed in further detail below.

This process may thus allow for the reconstruction of the original content in a seamless and secure fashion that enforces the sender's original recipient-specific privacy intentions for the various portions of the lossy file, while still allowing other unauthorized-recipients to view the redacted version of the file in standard viewing applications for the particular lossy file type.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the adaptive privacy control system to be described herein. In the server-entry point network architecture infrastructure 100 of FIG. 1A, centralized sync server 105 may be responsible for querying and obtaining all the messages from the various communication sources for individual users of the system, communicating public keys, applying adaptive privacy controls to lossy files or objects, which may be communicated to one or more users of the system synchronized with the data on the various third party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third party email server (e.g., a GOOGLE® or YAHOO!® email server). (GOOGLE is a registered service mark of Google Inc. YAHOO! is a registered service mark of Yahoo! Inc.) Third party email server 106 may be periodically pinged by sync server 105 to determine whether particular users of a multi-protocol, multi-format communication composition and inbox feed system described herein have received any new email messages via the particular third-party email services. Server 107 represents a third party instant message server (e.g., a YAHOO! ® Messenger or AOL® Instant Messaging server). (AOL is a registered service mark of AOL Inc.) Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' or 'on-system' users are communicating with one another via the multi-protocol communication system itself, such communications may occur entirely via sync server 105, and third party servers 106-109 may not need to be contacted. An 'on-network' user may include a user that has set up a user profile on sync server 105 specifying preferred communications formats and/or protocols for a given communication session/message (e.g., if the recipient is in an area with a poor service signal, lower bit-rate communication formats, such as text, may be favored over higher bit-rate communications formats, such as video or voice), and/or economic considerations of format/protocol choice to the recipient and/or sender (e.g., if SMS messages would charge the recipient an additional fee from his or her provider, other protocols, such as email, may be chosen instead).

Figure 1B:
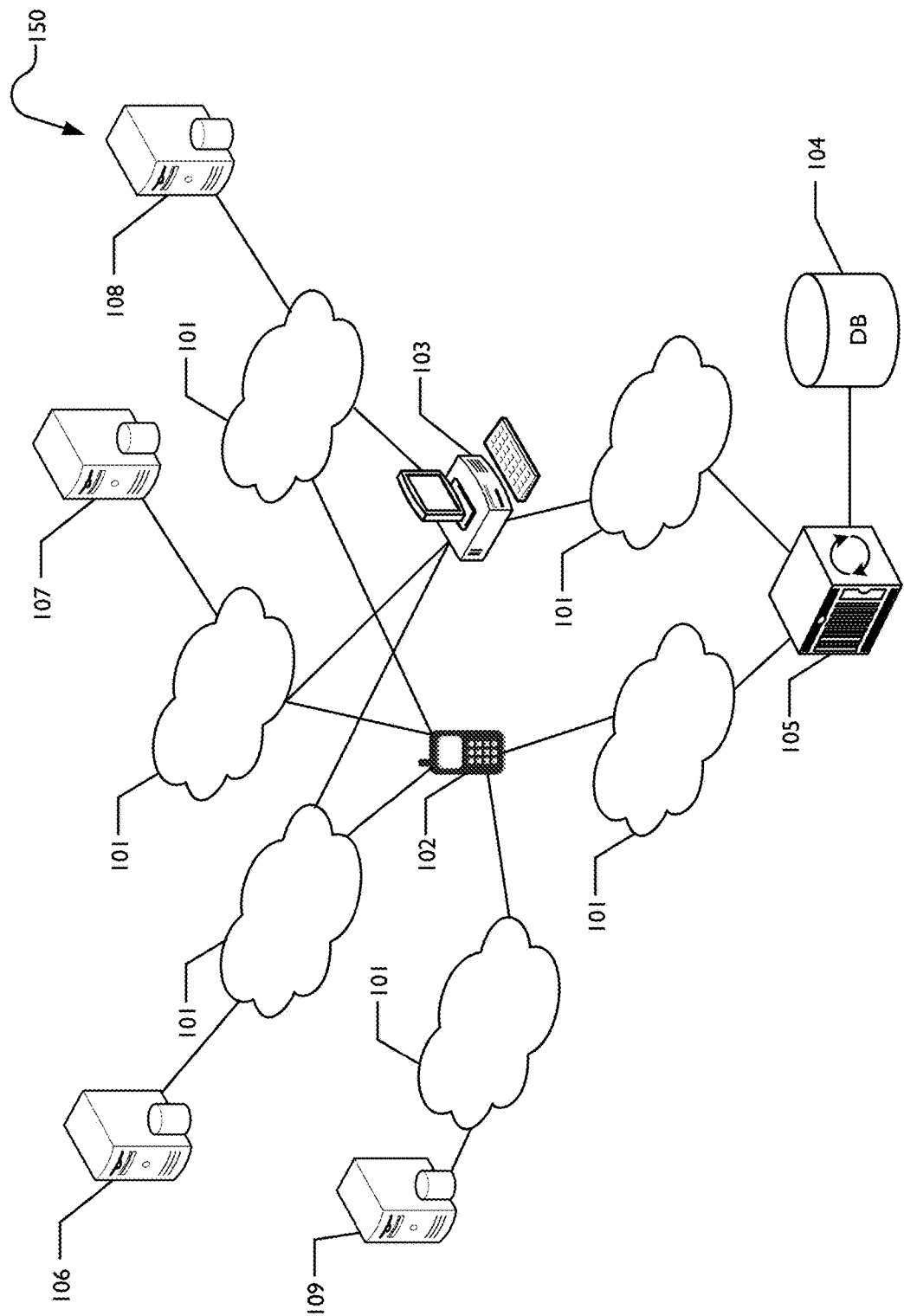
FIG. 1B is a block diagram illustrating a client-entry point network architecture infrastructure, according to one or more disclosed embodiments.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
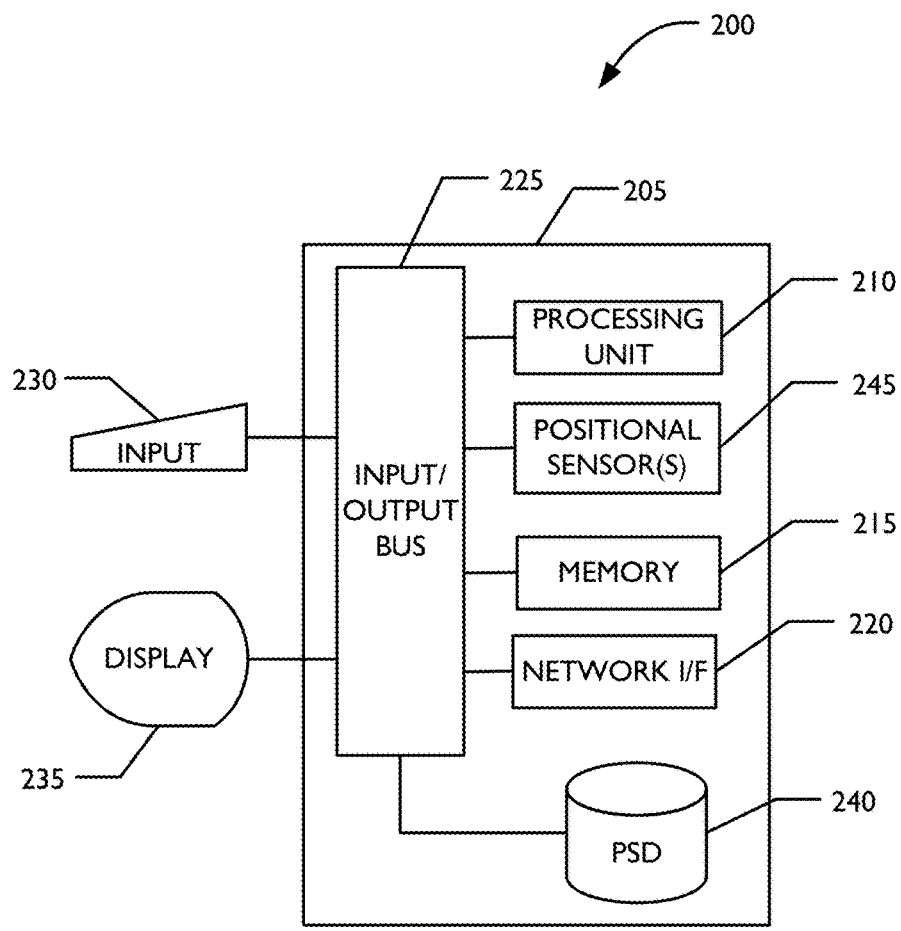
FIG. 2A is a block diagram illustrating a computer that could be used to execute the cloud-based user defined APC approaches described herein according to one or more of disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like and, which, may be used to track the movement of user client devices.

Figure 2B:
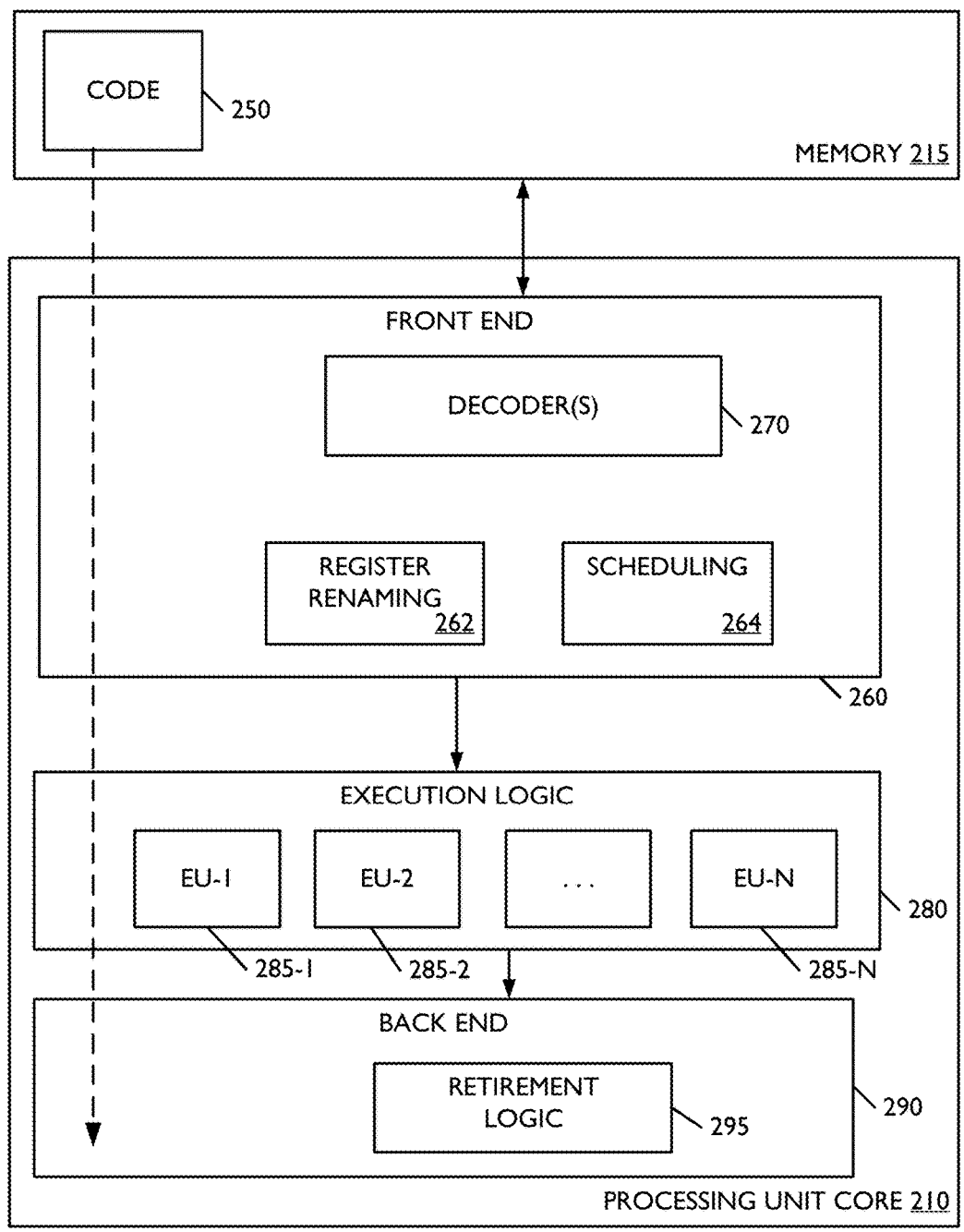
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals, which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

File- and Sub-File-Level Access Permission Setting Scheme with Custom, Recipient-Based Privacy Settings According to some embodiments of a system for providing Adaptive Privacy Controls (APC), file-level access permission setting may be implemented. For example, in one scenario, a user may wish to share a file of a lossy file type (e.g., a JPEG image that incorporates lossy compression) with a first colleague, but not allow that information to be visible to other colleagues who may receive the lossy file from the first colleague. The first colleague may be an 'on-system' recipient or an 'off-system' recipient. In such a scenario, User A may use the access permission setting system to send an obfuscated lossy file (e.g., by attaching the file to a MIME format email and sending using SMTP) to the first colleague, User B, while selecting the appropriate encryption attributes in the original lossy file to limit the visibility of User B (and other users who may view the container file) to only specific portions of the file's content. In one embodiment, User A may create an edited copy of the original file, referred to herein as an "obfuscated" lossy file. Obfuscation may include any of a number of techniques to "mask" the true contents of the file, e.g.: blurs, color-out, scratch-out, scribble-out, black-out, or the like at particular coordinate locations in the JPEG image that the sender wishes to obfuscate or protect portions of the image file. The client application or server (depending on the system architecture) may then "hide" (and optionally encrypt) the "true" copy of the obfuscated content within a part of the data structure of the lossy file. If encryption is desired, any compatible encryption process may be used, e.g., a public/private key process, with the specific public key being provided by the device, the recipient user, or another central authority to create an encrypted lossy file. User B can then receive a typical message with the lossy file attached, which includes the hidden (and optionally encrypted) true copy of the obfuscated portions of the file. In some embodiments, a part of the data structure of the lossy file may also include a deep-link for validating the receiving user's credentials, as well information for creating a so-called "phantom user identifier," e.g., a temporary authorized identifier that may be used by an 'off-system' user to authenticate himself or herself for the purposes of viewing a particular piece(s) of protected content. The deep-link may be used to validate user credentials, as well as to view the hidden (and/or encrypted) obfuscated contents of the file in a compatible authorized viewer application.

User B may be an 'on-network' or 'on-system' recipient or an 'off-system recipient'. If User B is an 'on-network' recipient, and the hidden "true" contents of the obfuscated portions of the file are also encrypted, the system may use one (or more) of a number of encryption schemes to ensure that only authorized recipients are able to view the true contents of the file. For example, the bits of the hidden "true" content of the obfuscated portions may be encrypted with different keys for different people/groups. Alternately, the bits may be encrypted once with a single key. The single key may then be encrypted many times with different per-user or per-device keys and stored within the same JPEG container thereby saving space. Alternately, the keys may be stored on the server and recalled dynamically, or they may be sent via public/private key exchange. Finally, the bits may be encrypted using Key-Policy Attribute Based Encryption (KP-ABE), regular public/private key, AES keys, or the like.

As mentioned above, another exemplary situation wherein sub-document-level access permission setting may be employed in the sharing of files of lossy file types, e.g., pictures, video, or other media content compressed using lossy compression, is the situation whereby specific portions of the media content require selective censorship, redaction, or other protection for certain recipients, so as to maintain desired privacy or security levels on a per-recipient level. In one scenario, User A, the sharer, may want to share a humorous JPEG picture with his wife (User B) and young son (User C). Knowing that the picture contains certain explicit words or imagery—but is still funny even without the explicit sub-portions of the content. User A may attach the photo to a message in an authorized 'on-system' application and use the application's selection capabilities to "block-out," or redact, the explicit sub-portions of the image. Prior to sending the lossy JPEG file, User A could instruct the system to allow User B to view the full uncensored image after receipt and decryption in an authorized viewing application, while only allowing User C to view the censored portions of the image. Embodiments of a system for providing Adaptive Privacy Controls as discussed above with respect to User A and User B are discussed in further detail below with respect to FIGS. 3A, 3B, 5, 6A, 6B, 7A, and 7B.

For the exemplary file-level privacy control scenarios described above, the application can present a view of the lossy file in question (e.g., via a compatible authorized file viewer or image thumbnail, etc.) to the sender of the lossy file. The sender can then use any desired form of selection input (e.g., touch gestures, mouse gestures, etc.) to indicate which content should be protected and/or access-controlled, e.g., via hiding and/or encryption. Those selections will be recorded and either processed locally or sent to a central server (depending on client capabilities), whereby the system will process the object's original source code (e.g. in XML format, JPEG format, etc.), corresponding to the section or sections matching the user selection, in order to enforce the user's selection of protected and/or access-controlled portions.

The section(s) in question may then be isolated (maintaining suitable markup) at the code level and, if desired, encrypted (e.g., using any one of standard encryption practices, such as asymmetric public/private key, or more advanced Key-Policy Attribute Based Encryption, i.e., "KP-ABE," etc.). The marked-up sections are identified at the code level, with pixel coordinates being replaced at the code level to generate representative pixels that are black, blurred, scratched, or similarly obfuscated when viewed by an unauthorized viewer in a compatible application for the particular file type of the lossy file. Certain embodiments may replace selected bit array regions with other content to be read by an authorized viewer application to perform custom operations and prompt the application to contact a server to retrieve access codes for the obfuscated file (if encrypted) in an attempt to decrypt with the private key stored in the authorized application. Unsuccessful retrieval or decryption will result in the recipient only viewing the obfuscated lossy file that depicts "part" of the original file. Because this service requires knowledge of the markup structure of any compatible file type, all APC changes may be made with data at the code level to create a "flat" file, while keeping the protected sections encrypted in complementary file portion(s), such that the application may insert the protected sections if user privileges are verified to view the protected sections. In some embodiments, the complementary file portion(s) may be inserted as hidden data within the data structure of the original file, resulting in a single, larger file, rather than being transmitted along with the original file as a distinct file(s).

Figure 3A:
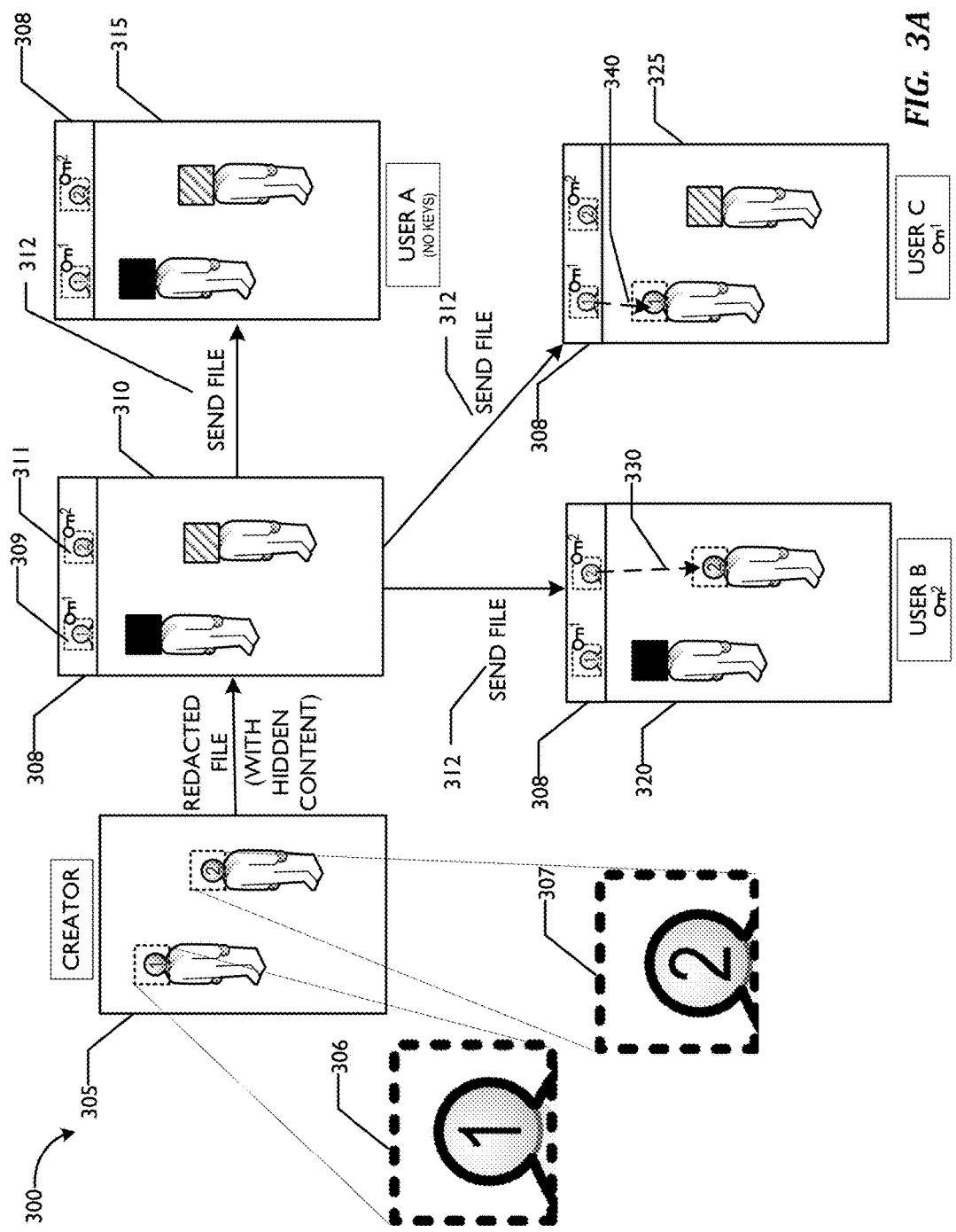
FIG. 3A shows an example of a sub-document-level access permission setting scheme with custom recipient-based privacy settings, according to one or more disclosed embodiments.

FIG. 3A shows an example of an access permission setting scheme 300 with custom recipient-based privacy settings for JPEG files, according to one embodiment. As demonstrated in the exemplary access permission scheme 300, a creator or sender ("Creator") may create or edit an image, such as a JPEG file 305, with custom permission settings applied to it. For example, Creator may edit a copy of a JPEG file to obfuscate information in one or more portions of the JPEG file 305. Specifically, the Creator may identify particular redacted portions in the JPEG file 305 to block out from view of certain recipients of the JPEG file 305. In this example, JPEG file 305 comprises two human subjects, whose heads are labeled '1' and '2' for illustrative purposes. The first portion selected for obfuscation by the Creator is portion 306, which covers the head of person '1,' as is shown in zoomed-in form in FIG. 3A for illustrative purposes. The second portion selected for obfuscation by the Creator is portion 307, which covers the head of person '2,' as is shown in zoomed-in form in FIG. 3A for illustrative purposes.

The obfuscated portions 306 and 307 of JPEG file 305 are represented by the black and diagonally-striped squares, respectively, over the corresponding portions of the redacted copy of the JPEG file shown in element 310 in FIG. 3A. For example, pixels at particular coordinates in the redacted copy of the JPEG file 310 may be overwritten at the bit-level to obfuscate the sub-portions of the image 305 corresponding to portions 306 and 307. The protected portions 306 and 307 from the original JPEG file 305 may be hidden (and optionally encrypted), e.g., within one or more applicable header parts 308 of the redacted copy of the JPEG file 310, in order to protect the information prior to transmission to recipient users. As shown in FIG. 3A, the hidden (and optionally encrypted) data corresponding to portion 306 from the original JPEG image file 305 (i.e., the head of person '1') is labeled 309, and is shown overlaid with a key icon and a small number '1.' The key icon 309 with the number '1' next to it indicates that only recipients authorized to see the head of person '1' (e.g., either through pre-set access permissions and/or by virtue of holding the appropriate decryption key)—when viewing the JPEG file 310 in authorized viewing application—will actually be able to see the "true" content of portion 306, i.e., the head of person '1.' Any recipient that is not an authorized recipient of portion 306—or who is viewing image 310 outside of an authorized viewing application—will simply see the black box over the head of person '1.' Likewise, The key icon 311 with the number '2' next to it indicates that only recipients authorized to see the head of person '2' (e.g., either through pre-set access permissions and/or by virtue of holding the appropriate decryption key)—when viewing the JPEG file 310 in authorized viewing application—will actually be able to see the "true" content of portion 307, i.e., the head of person '2.' Any recipient that is not an authorized recipient of portion 307—or who is viewing image 310 outside of an authorized viewing application—will simply see the diagonally-striped box over the head of person '2.'

The obfuscated JPEG file 310 that has been augmented with the hidden (and optionally encrypted) redacted content 309 and 311 may then be selectively shared with one of three separate users in this example: User A, User B, and User C. In this example, each of User A, User B, and User C may receive the same redacted JPEG image file 310. In this embodiment, the access permissions for the redacted JPEG image file 310 may be defined differently for each of User A, User B, and User C, such that each User may be able to view one or more different portions of the redacted information as it was presented in the original JPEG file.

Finally, the Creator may choose to send the JPEG file 312 to three separate users (either simultaneously or at different times), with the same portions obfuscated out for each recipient (i.e., portions 306 and 307 in this case). However, each user may be able to locate (and optionally decrypt) the hidden portions 309 and 311 (corresponding, in this case, to the heads of persons '1' and '2,' respectively) from the header 308 of the JPEG file 310, in order to view non-redacted portions of the JPEG image file, in accordance with, e.g., their identity, access permissions, status as a member of a particular group, or their status as a follower of the Creator, etc.

For example, as is shown in FIG. 3A, the view 315 of the obfuscated file 310 sent to "User A" 315 may still comprise both of the blocked out portions 306 and 307 form the original image 305, e.g., owing to the fact that User A lacks either the appropriate access permissions and/or decryption keys to view the "true" content of portions 306 and 307 from the original image 305. By contrast, the view 320 of the obfuscated file 310 sent to "User B" has only portion 306 (i.e., the portion corresponding to the head of person '1') blocked out from the view, e.g., owing to the fact that User B lacks either the appropriate access permissions and/or decryption keys to view the "true" content of portion 306 from the original image 305 but does have the appropriate access permissions and/or decryption keys to view the "true" content of portion 307 from the original image 305 (i.e., the portion corresponding to the head of person '2'). This is indicated by arrow 330 showing the protected portion corresponding to the head of person '2' being located, decrypted (if necessary), and seamlessly displayed at the correct coordinates within the image. It is also indicated by the presence of the key icon with the number 2 below the "USER B" label in FIG. 3A, denoting the fact that USER B has the necessary permissions and/or decryption keys to locate and decrypt hidden portion 311. Finally, the view 325 of the obfuscated file 310 sent to "User C" has only portion 307 (i.e., the portion corresponding to the head of person '2') blocked out from the view, e.g., owing to the fact that User C lacks either the appropriate access permissions and/or decryption keys to view the "true" content of portion 307 from the original image 305 but does have the appropriate access permissions and/or decryption keys to view the "true" content of portion 306 from the original image 305 (i.e., the portion corresponding to the head of person '1'). This is indicated by arrow 340 showing the protected portion corresponding to the head of person '1' being located, decrypted (if necessary), and seamlessly displayed at the correct coordinates within the image. It is also indicated by the presence of the key icon with the number 1 below the "USER C" label in FIG. 3A, denoting the fact that USER C has the necessary permissions and/or decryption keys to locate and decrypt hidden portion 309.

Such a system allows a single version of the lossy file type, for example, JPEG file 305, to be sent to multiple recipients, while access permission settings associated with each recipient allow each recipient to be able to use an authorized viewing application to seamlessly view only the particular sub-portion(s) of the file that they are authorized to see, while still maintaining the integrity of the lossy file type, such that it could be viewed in a standard, i.e., unauthorized, viewing application without any of the redacted portions of the file being visible.

Figure 3B:
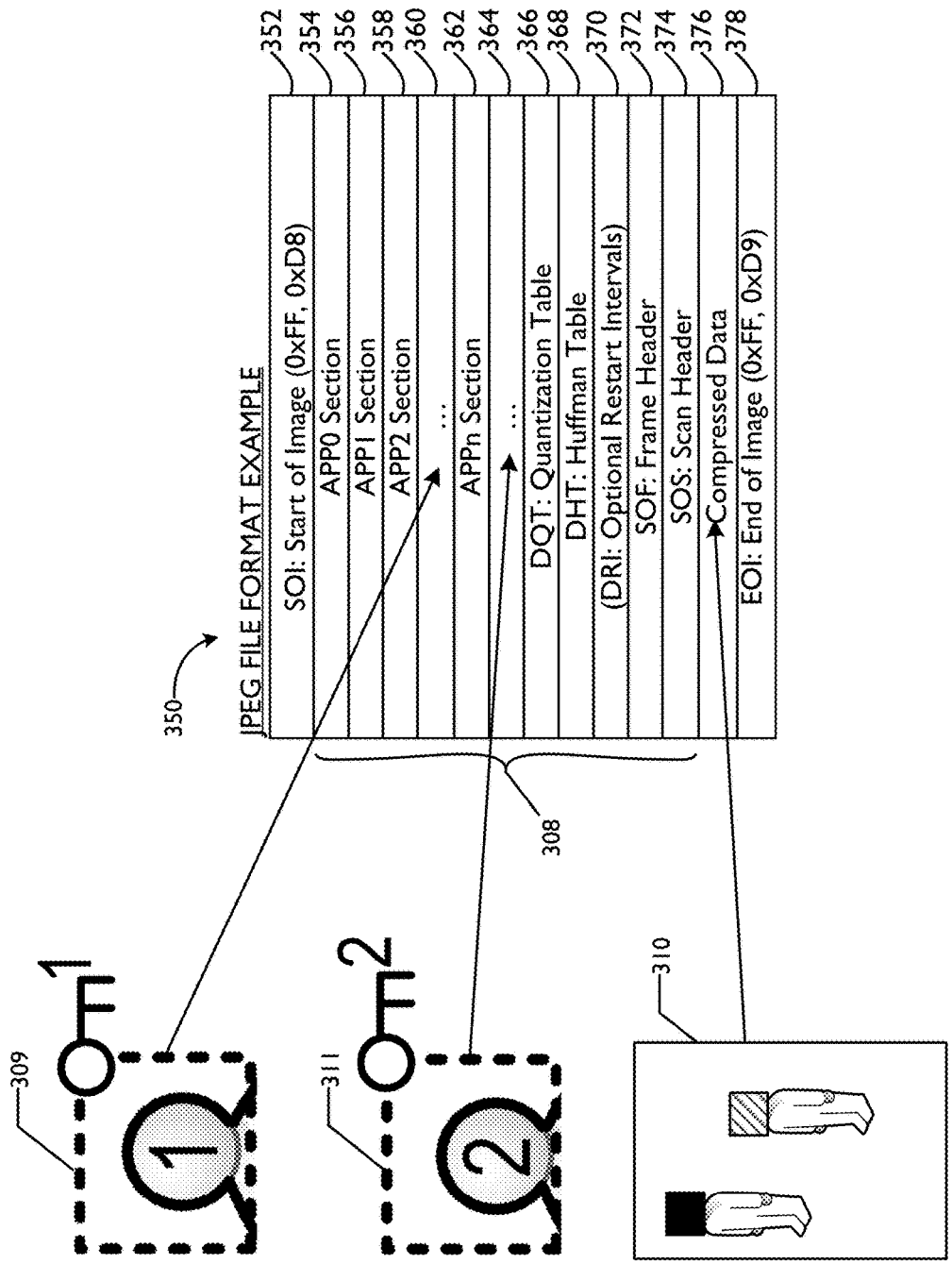
FIG. 3B shows an example of a lossy file type used to store hidden (and/or encrypted) content.

Turning now to FIG. 3B, an example of a lossy file type used to store hidden (and/or encrypted) content is shown in greater detail. In this example, the lossy file type is shown via exemplary JPEG object 350, which shows one example of a JPEG file format structure. JPEG object 350 is comprises of a plurality of fields 352-378. Data structures for lossy file formats are typically defined over time by the applicable standards settings bodies for each respective file format, and thus are not something that a particular user or system may be able to modify if they wish to have their files be readable/writeable/executable by industry standard viewers for the particular file format. For example, exemplary JPEG object 350 may begin with Start of the Image marker (SOI) property 352. This property may then be followed by a plurality of Application Marker Sections (APPn) labeled 354/356/358/362. Various other properties may also be present in a typical JPEG object file structure, e.g., DQT: Quantization Table (366); DHT: Huffman Table (368); DRI: Optional Restart Intervals (370); SOF: Frame Header (372); and SOS: Scan Header (374). The JPEG object file structure may also include a "Compressed Data" element 376, where the actual compressed JPEG image data displayed to a user, e.g., JPEG image 310 from the example of FIG. 3A, may be stored. Finally, exemplary JPEG object 350 may conclude with End of the Image marker (EOI) property 378.

Among the various header elements 308 of JPEG object 350 may also be one or more fields 360/364 where the aforementioned "hidden" (and/or encrypted) redacted content from the image may be stored. In this example, the (optionally encrypted) "true" content from image portion 309 (i.e., the portion corresponding to the head of person '1') is stored in exemplary element 360, and the (optionally encrypted) "true" content from image portion 311 (i.e., the portion corresponding to the head of person '2') is stored in exemplary element 364. In some embodiments, the "hidden" (and/or encrypted) redacted content stored in the metadata of the file object may comprise binary data representing a single PNG layer. In some embodiments, the single PNG layer may further comprise a transparent region around the protected portion that is co-extensive in scope with the original file, so that it may be properly aligned with the original file if/when later layered atop the original file, e.g., in an authorized viewing application, as will be described in further detail below with regard to FIG. 8.

As may now be understood, one or more versions of each redacted portion of the lossy file type may be stored at one or more portions of the lossy file's data structure. Each such portion may be encrypted in such a fashion that only the desired recipient(s) are able to decrypt the respective portions. In some embodiments, only an authorized viewer application may know: 1.) where to look in the lossy file's data structure for "hidden" content; 2.) how to decrypt (if necessary) such hidden content intended for a particular recipient; and 3.) how and where (e.g., at what coordinates or at what time stamp) to "re-insert" the located and decrypted information into the original lossy file (e.g., in the form of an individual layer that is layered atop the version of the file having the obfuscated protected content), so as to seamlessly present a view of the lossy file to the desired recipient that shows only those portions of the file that the sender intended the desired recipient to be able to see.

APC System Access Permission Settings Options

Several examples of potential APC system permissioning settings that may be applied to particular files of known lossy file types are shown and described below:

Public: Visible to the world. Searchable by search engines. Auto-broadcasted to the creator's "Followers." The "followers" of a particular user may be established by the followers that have been created within the APC file access permission setting system itself (if the recipients are users of such a system), or may be pulled in from third-party services, such as Facebook, Twitter, LinkedIn, etc.

Followers: Notifies and is visible to all followers of the creator.

Just Me: Private setting. Viewable only by user that creates the lossy file type.

My Contacts: All contacts available on user's contact list. The "contacts" of a particular user may be established by the contacts that have been created within the APC file access permission setting system itself, or may be pulled in from third-party services or applications, such as Gmail, Yahoo! Mail, Outlook, etc.

Level 1 Contacts: All registered-user contacts who have directly connected with the creator via the APC file access permission setting system itself, e.g., by accepting an invitation from the creator to become a contact. This access permission setting may be thought of as being bi-directional, e.g.: 1.) User A invites User B, and User B accepts; 2.) User B invites User A, and User A accepts. In some embodiments, all "Level 1" contacts of a user may be automatically added to that user's "My Contacts" list.

Level 2 Contacts: Direct contacts of the user's Level 1 contacts.

Level 3 Contacts: Direct contacts of user's Level 2 contacts.

Groups: Users may create one or multiple custom groups for use with the APC access permission setting system.

Custom: Users may manually add contacts, e.g., using an email address or name. The APC file access permission setting system may then auto-suggest users based on name entry (if the name is present in the user's "My Contacts" list). Lossy file types that have a custom access permission setting system associated with them will then only be viewable by the particular users whose information may be added to the custom authorization list for the lossy file type.

Figure 4:
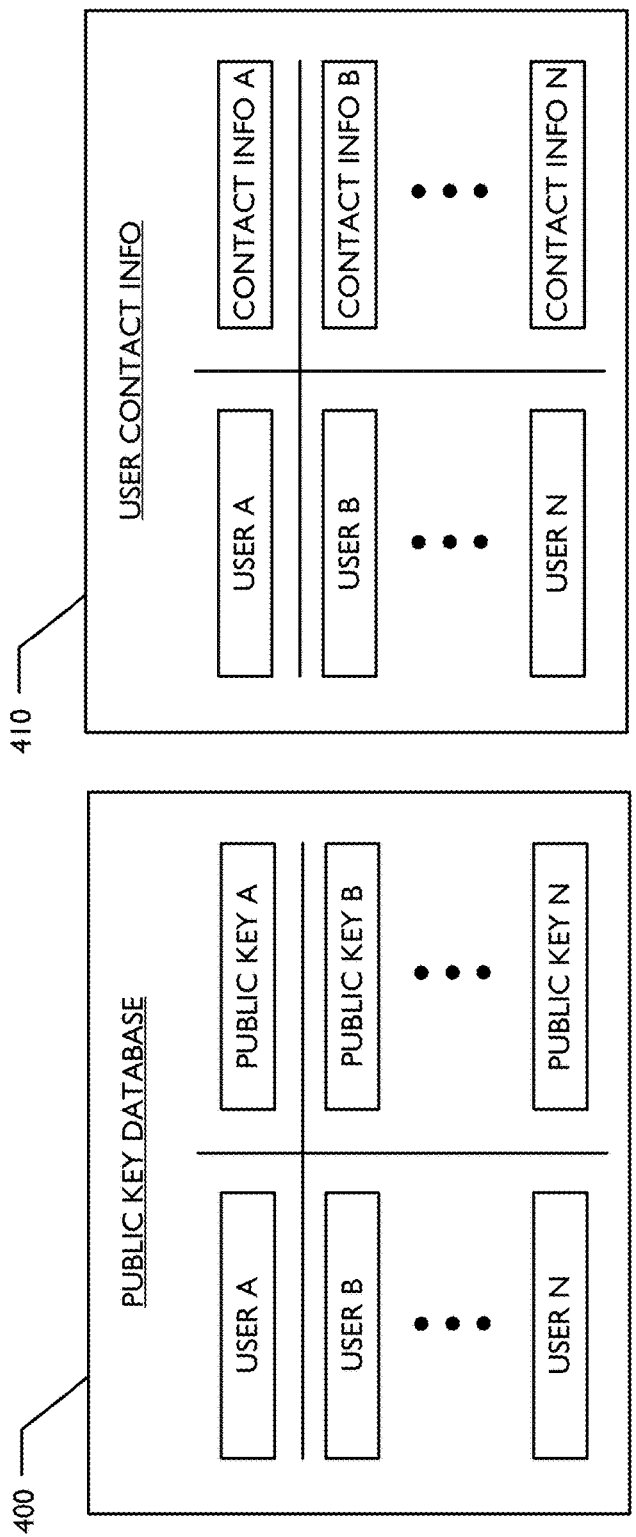
FIG. 4 shows an example of customized privacy setting using encryption keys, according to one or more disclosed embodiments.

As will be understood, the settings levels described above are merely exemplary, and other ways of specifying access permission setting schemes may be used in particular implementations of an APC file access permission setting system Customized Privacy and Access Permission Setting Using Encryption Keys FIG. 4 shows an example of a customized APC system that defines access permission setting for one or more users using encryption keys, according to one or more disclosed embodiments. In an embodiment, any encryption methodology may be used such as, for example, AES encryption, or Key-Policy Attribute-Based Encryption (KP-ABE), but other similar encryption methodologies are also contemplated within the scope of the embodiments. Public key database 400 comprises an association of user profiles and public keys associated with those users. User A in public key database 400 may refer to the sender in the scenario described above with reference to FIG. 3, whereas Users B-N may refer to potential desired recipients in the scenario described above with reference to FIG. 3. User contact info database 410 comprises an association of user profiles and contact information associated with those users. Again, user A in contact info database 410 may refer to the sender in the scenario described above with reference to FIG. 3, whereas Users B-N may refer to potential desired recipients in the scenario described above with reference to FIG. 3.

According to some embodiments of the customized privacy settings system described herein, a user may define the recipients for a particular lossy file type, for example, recipients that can view one or more portions of the JPEG file based on user settings. The user may set privacy setting for a particular user, public (e.g., universally viewable) or to a particular group of recipients.

According to one embodiment of a method of utilizing user-defined privacy settings for file sharing, first, the user, e.g., User A as shown in FIG. 4, may create a JPEG file or, alternatively, may select a JPEG file that user A desires to send. Next, the user may choose the user or users that are user A's desired recipients for the selected JPEG file, e.g., User B. Next, the user A contact information, e.g., "Contact Info B" in the contact info database 410 of FIG. 4, is matched to the user or users that are the desired recipients of the document. Next, each desired recipient user's information may be found in the public encryption key database, e.g., "Public Key B" in public key database 400 of FIG. 4. Finally, the located public key, e.g., "Public Key B," that may include a set of attributes associated with each user is used to encrypt protected portions in an original JPEG file to create encrypted ciphertext. Further, an edited or obfuscated JPEG file is created that includes the one or more protected portions with coordinates of the JPEG file that may be replaced with black, blur, or the like to create an obfuscated JPEG file. Information that defines whether the obfuscated file is current and/or access code to access a current version of the obfuscated file may also be transmitted as metadata within the obfuscated JPEG file. The encrypted protected portions of the JPEG file and the obfuscated JPEG file may be sent to each of the desired recipients (either separately, or with the protected portions embedded or "hidden" within the obfuscated JPEG file's data structure, as discussed above), who may then use their private keys based on the user attributes to locate and decrypt the encrypted portions of the JPEG file and selectively replace the obfuscated portions with protected information from the decrypted JPEG file based on the user attributes. In some embodiments, attributes can include time of day (viewing at a specific time), location (viewing within a specific location or distance to a GPS location), or the like.

Figure 5A:
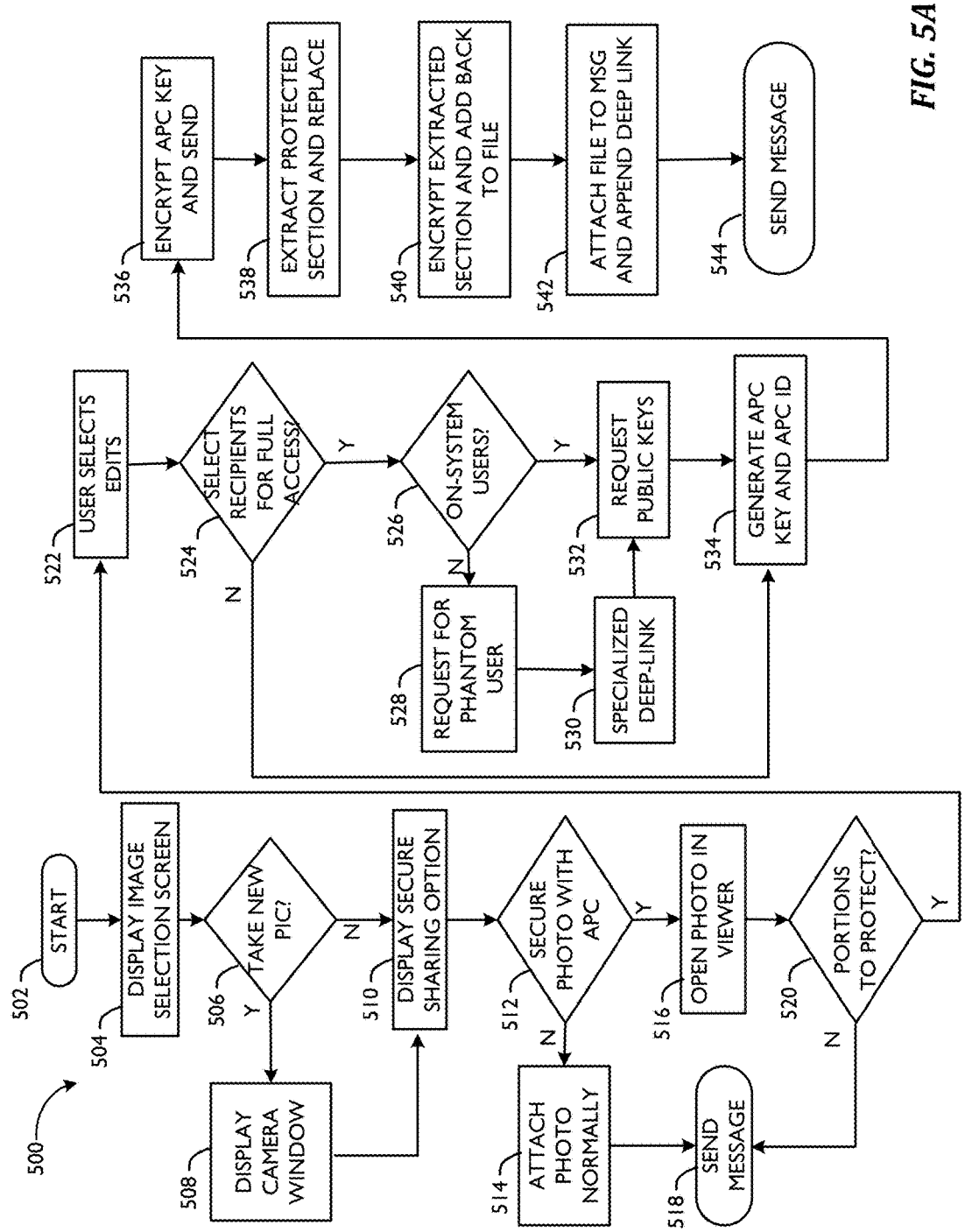
FIG. 5A is a flowchart showing a method for utilizing an APC process for lossy files from a sender's perspective, according to one or more disclosed embodiments.

FIG. 5A is a flowchart that depicts a method or process flow 500 for utilizing the APC process from a sender's perspective, according to one or more embodiments. Particularly, flow 500 may be used by a user to attach an obfuscated file, created through user edits, and send the obfuscated file together with optionally encrypted portions of the original file to user recipients (or groups of recipients) associated with on-system or off-system client devices. Flow 500 begins in 502 and, next, the sender may be prompted to select a JPEG image from an image selection screen (step 504). The image selection screen may display one or more JPEG images that may be received from, for example, sync server 105 or from a storage location on the on-system client associated with the sender. Sender may determine whether to take a new picture, e.g., using his or her device's camera application (step 506). For example, the sender may either capture a new image (i.e., step 506="Y") at step 508 or simply select an existing image from his or her device (and or accessible third party storage) (i.e., step 506="N") before proceeding to step 510, where the on-system client may display an APC access permission settings dialog box.

Next, system may determine whether to apply APC access permission settings to the JPEG image (step 512). Access permission settings may be manually received by the sender or may be automatically set based on predefined permissions for the sender that are defined for one or more users in contacts. If APC access permission settings are not applied to the JPEG image (i.e., step 512="N"), then the sender may save the JPEG image as a "normal" JPEG image file (step 514) and may use the sync server 105 to transmit the JPEG image file to one or more recipients (step 518).

However, if APC access permission settings are to be applied to the JPEG image (i.e., step 512="Y"), then the sender may open the JPEG image in a viewer, e.g., using an on-screen client (step 516).

Next, the sender may determine whether to protect one or more portions of the JPEG image (step 520). If the JPEG image is not to be protected (i.e., step 520="N"), then, step 520 proceeds to step 518 where the sender may send the unprotected JPEG file as a "normal" JPEG image file.

However, if one or more portions of the JPEG image are to be protected (i.e., step 520="Y"), then the sender may select one or more protected portions of the JPEG image to protect and replace with obfuscation in a copy of the JPEG image file (step 522). Obfuscation can include selection of edits to the pixels in the image that can include blur, color-out, scratch-out, or the like at the coordinate locations within the code that defines the data for the coordinate locations in the JPEG image.

Next, sender may determine whether there are one or more recipients that may receive access to the full content of the JPEG image (step 524). The recipients for the entire contents of the full JPEG image file can include recipients in the sender's contacts, direct contacts of the user contacts through level 1, 2 and 3, or custom contacts identified by the sender or system, as discussed above. If one or more recipients are selected (i.e., step 524="Y"), then the system may determine if any recipients are on-system users (step 526). If the recipients are on-system users (i.e., step 526="Y"), then, step 526 proceeds to step 532 where the system may request public keys for a particular encryption methodology for each selected recipient (if so desired).

However, if any recipients are off-system users (i.e., step 526="N"), then step 526 proceeds to step 528 where system 528 may request that a phantom user identifier be created for contacts associated with the off-system recipients. Next, sync server 105 may generate a specialized deep-link associated with the phantom user identifier (step 530). The deep-link may include a hypertext link to a page on a web site that includes, in some embodiments, information for logging-into the system for accessing information associated with the JPEG image file having hidden (and optionally encrypted) content and entering user credentials associated with the user recipient. Step 530 proceeds to step 532 where system requests public keys for the identified recipients.

However, if there is at least one recipient that receives restricted access to content in the JPEG file (i.e., step 524="N"), then the system may generate, in an embodiment, APC encryption keys for encrypting distinct protected portions of the JPEG file and APC identifiers associated with the respective keys (step 534). APC identifiers may include access codes that identify the current protection settings for the JPEG file. The APC keys may be generated according to a Key Policy Attribute Based Encryption (KP-ABE) methodology. In KP-ABE, APC encryption keys and ciphertext (i.e., encrypted protected portions) are each labeled with descriptive attributes that controls which ciphertexts a user recipient is able to decrypt. Attributes that match may provide a user with the requisite access to the protected sections of the lossy file. It is to be understood that, although KP-ABE encryption is discussed here, any suitable form of asymmetric encryption may be utilized to encrypt the image file and/or portions of the image file. Further, any suitable key size, e.g., 128, 192, or 256 bits, may be used, based on a particular implementation of the APC system.

Next, each APC key and recipient's public key may be encrypted and sent to the desired recipients in a message, text, or the like (step 536). The selected coordinates that define protected portions of the JPEG image that were identified in step 522 are extracted and replaced in the original JPEG file with obfuscated portions (step 538). The original JPEG file can include one or more protected portions, including the entire JPEG image. As discussed above, obfuscation can include selection of edits to the pixels in the image that can include blur, color-out, scratch-out, or the like at the coordinate locations within the code that defines the data for the coordinate locations in the JPEG image. The obfuscated JPEG information is saved as an obfuscated JPEG file.

Next, the protected portions from the original JPEG file with the extracted information may be encrypted with the APC key and added back into the file structure of the original JPEG file to create an encrypted protected JPEG file, e.g., in an unused header element, as discussed with reference to FIG. 3B above (step 540).

The image file with the hidden and optionally encrypted protected portions may then be attached to a message and appended (if so desired) with the specialized deep-link generated in step 530 (step 542). Process 500 ends when the message (including any newly-encrypted protected portions) is sent to the desired recipient(s) (step 544).

Figure 5B:
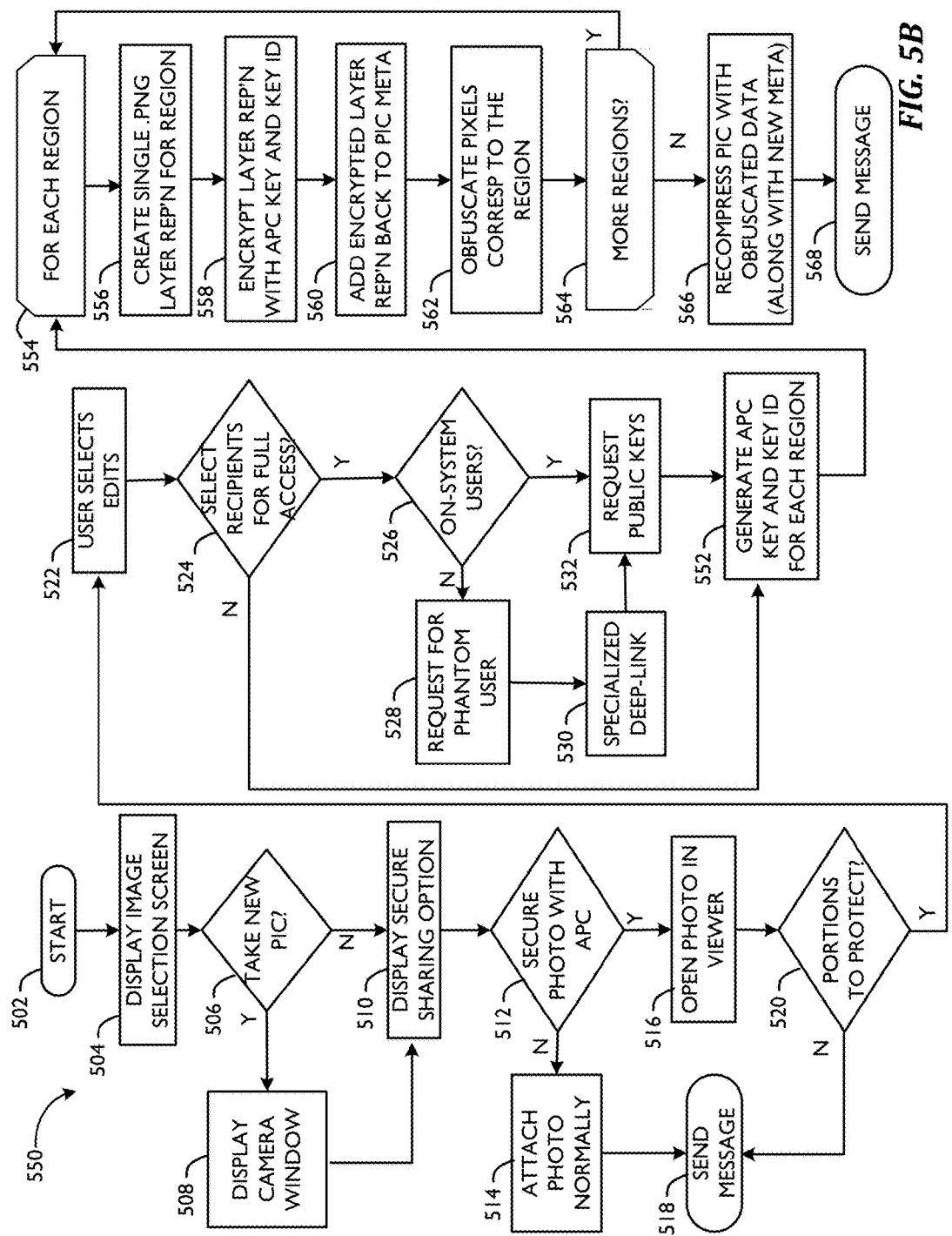
FIG. 5B is a flowchart showing a method for utilizing a multi-region, layer-based APC process for lossy files from a sender's perspective, according to one or more disclosed embodiments.

FIG. 5B is a flowchart that depicts a method or process flow 550 for utilizing a multi-region, layer-based APC process for lossy files from a sender's perspective, according to one or more embodiments. Steps 502-532 of FIG. 5B are identical to their counterpart numbered elements in FIG. 5A. However, at step 552, the flow 550 of FIG. 5B differs from the flow 500 of FIG. 5A. In particular, at step 552, APC keys and corresponding key IDs may be generated for each region of the file that the user has indicated a desire to protect. In this example, the term "key ID" refers to a system-level identifier, which can be used for various purposes such as: tracking, key identification, management, version tracking, etc. Then, for each region (step 554), the method may create binary data representing a single PNG-layer representation for the region (step 556). In some embodiments, the single PNG-layer may comprise only the original contents of the protected region (i.e., located at the relative position of the pixels corresponding to the protected region of the image), while the remainder of the layer, which may be co-extensive in dimensions with the original image, may be filled with transparent pixels. Next, each region may be encrypted with the corresponding APC key and pre-appended with the corresponding key ID (step 558). Next, the encrypted data may be added back into the file structure of the original file to create an encrypted protected file, e.g., in an unused header element, as discussed with reference to FIG. 3B above (step 560). In some embodiments, a particular or special set of 'delimiter' bits may be added into the file structure so that the viewing application knows where to look in the file's data to find the start of the encrypted content. Finally, the pixels in the original file corresponding to each region may be obfuscated using a desired obfuscation techniques(s) (Step 562). As mentioned above, the process of steps 556-562 may be repeated for each region in the original file for which the user has indicated a desire to apply APC protection.

Once all of the protected regions have been extracted, transformed to PNG layer representations, encrypted, and the underlying protected regions of the original file obfuscated (if desired), the original file may be recompressed with all of the protected regions obfuscated and the encrypted PNG layers of the protected regions having been added back into the file structure of the original file to create an encrypted protected file, e.g., in an unused header element, as discussed with reference to FIG. 3B above (step 566). Finally, the outgoing message may be sent to the intended recipient(s) with the encrypted protected file attached (step 568).

Figure 6A:
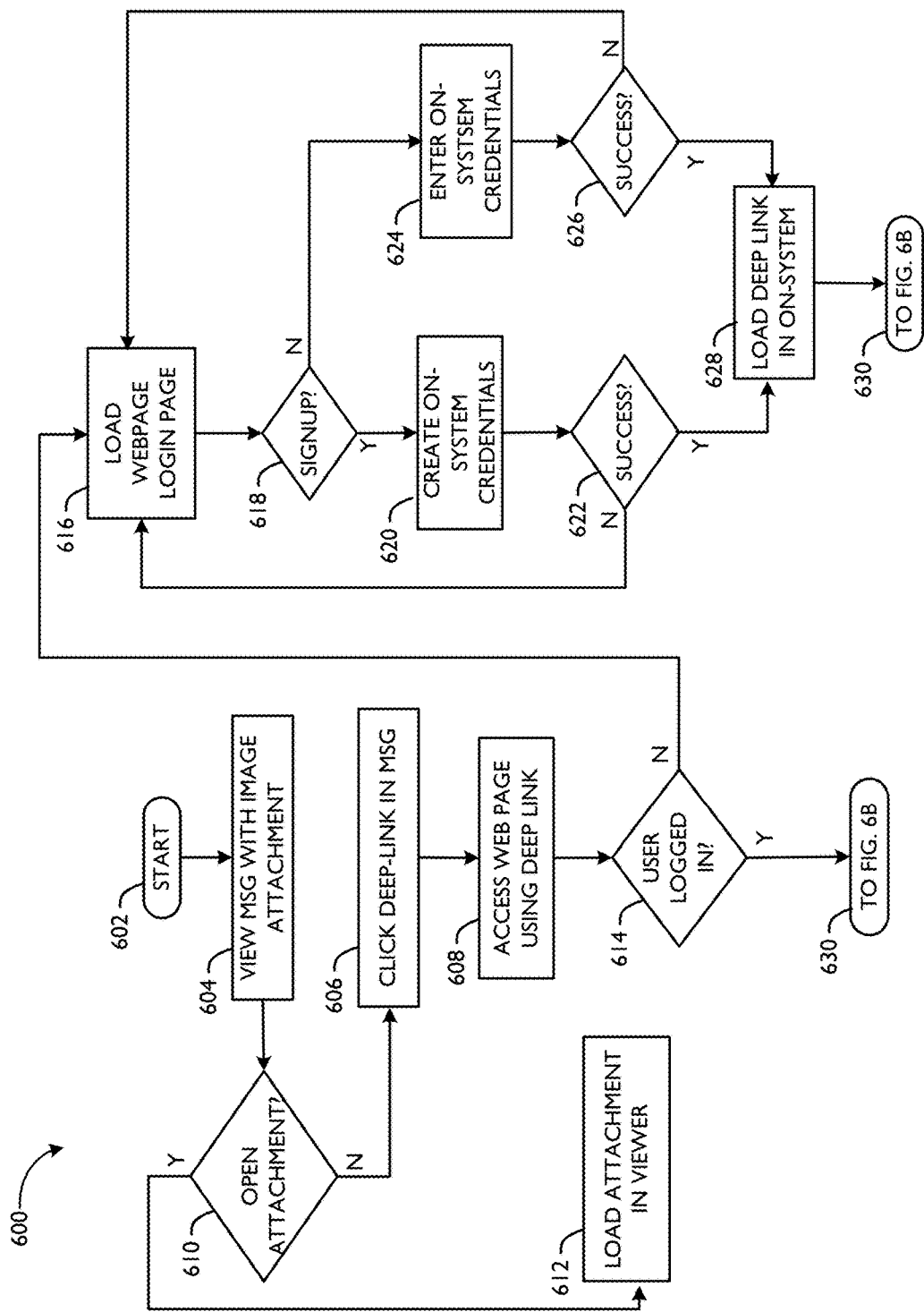
FIGS. 6A-6B show flowcharts that depict a method for utilizing a single-region APC process for lossy files from a receiver's perspective, according to one or more disclosed embodiments.
Figure 6B:
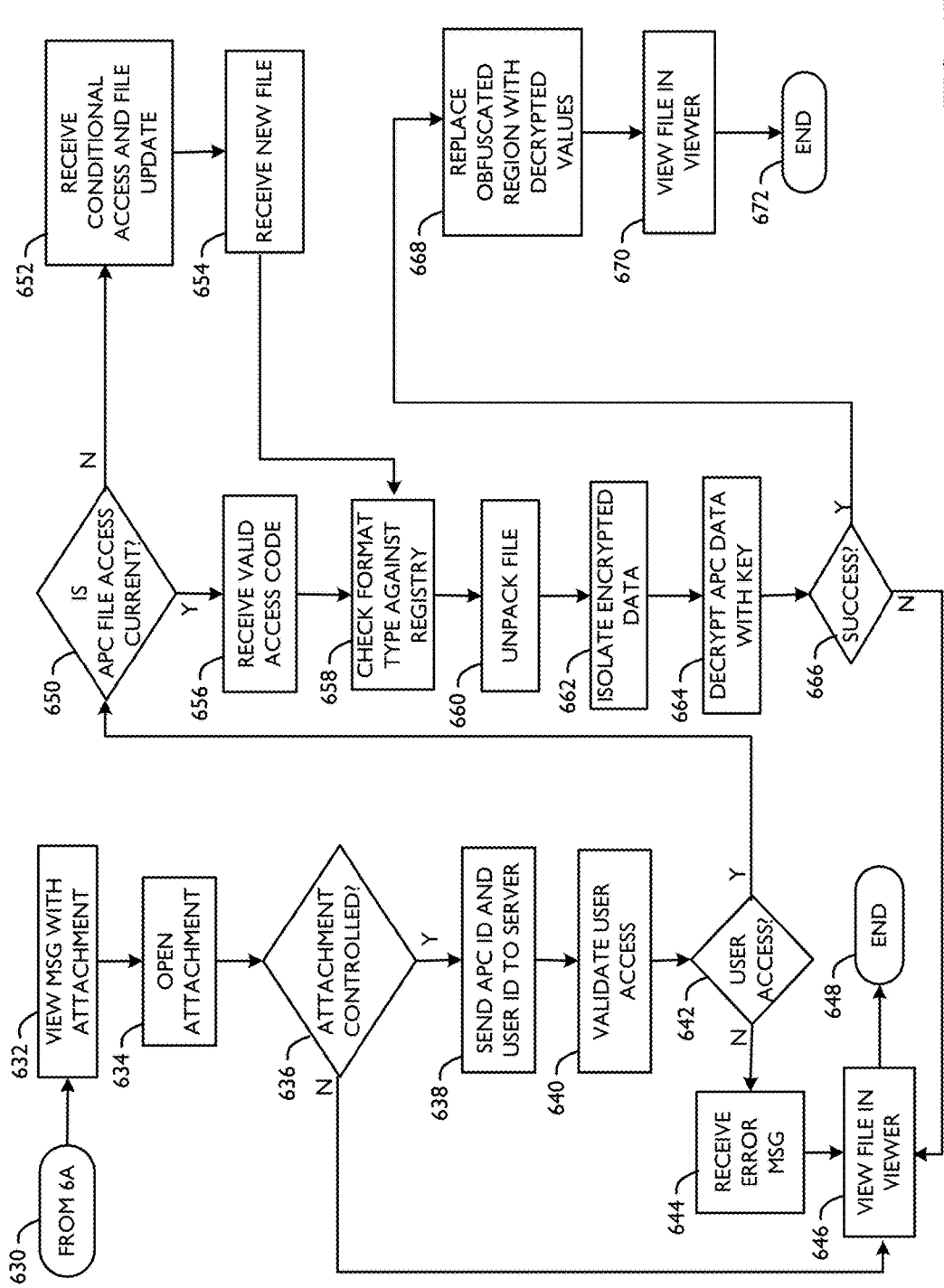

FIGS. 6A-6B depict flowcharts that show a process 600 from a receiver's or recipient's perspective, according to one or more embodiments. Process 600 begins in step 602, and in step 604, a receiver may view (e.g., in a third-party email client or a web browser) a message with an image attachment that is received, e.g., in a known lossy file format. In 610, the receiver may determine whether to download and open the attachment in an off-system device, e.g., via a plug-in. If the receiver chooses to open and/or download the attachment (i.e., step 610="Y"), then the receiver may load the file in an appropriate 'off-system' image viewer on the receiver client device (step 612). However, if the receiver chooses not to download or open the attachment in an appropriate 'off-system' viewer, (step 610="N"), then the receiver may click the deep-link in the message to receive access to the JPEG image (step 606). Next, clicking the deep-link redirects the receiver to a web page associated with the deep-link (step 608), e.g., an 'on-system' web page. For example, the redirected web page may be a landing page for an account that is associated with the on-system network of the receiver or a login page for an on-system network to establish an account in the system. Next, the system determines whether the receiver is logged into the system (Step 614). If the receiver is logged into the system (i.e., step 614="Y"), process 614 proceeds to step 630 (which follows on to FIG. 6B).

However, if the receiver is not logged into the system (i.e., step 614="N"), then the system may load a login web page that prompts the receiver to input the receiver's credentials for authentication (step 616). Next, the receiver may sign-on to create on-system credentials or may enter on-system credentials for an existing account in the system (step 618). If the receiver signups to be an on-system user (i.e., step 618="Y"), then, the receiver enters credentials in the system to create an account as an on-system user (step 620). If the credentials are successfully entered into the system (i.e., step 622="Y"), the webpage associated with the deep-link is loaded in a viewer for the on-system receiver (step 628). However, if the credentials are not successful (i.e., step 622="N"), the webpage may be redirected to a login webpage for reentry of user credentials and/or an error message may be provided (step 616). Step 628 proceeds to step 630.

If the receiver logs into the system as an on-system user (i.e., step 618="N"), then the receiver may enter on-system credentials to be authenticated in the system (step 624). If the credentials are accepted (i.e., step 626="Y"), then the deep-link hyperlink may be loaded in an on-system viewer associated with the on-system receiver (step 628). Step 628 proceeds to step 630 (which follows on to FIG. 6B).

Referring now to FIG. 6B, step 630 proceeds to step 632 where a receiver may view the message having the attachment in a compatible viewer on a receiver's authorized client device. The attachment can be an unprotected JPEG file or a obfuscated JPEG file with the associated extracted (and optionally encrypted) protected portions of the original JPEG file "hidden" in one or more parts of the JPEG file's data structure. Next, the client device may open the attachment when the user selects the attachment (step 634). Next, the system determines whether the attachment includes APC access permission settings (step 636). If APC access permission settings are not applied to the attachment (i.e., step 636="N"), then the original JPEG file may be displayed on a compatible viewer on the receiver's client device (step 646). Step 646 proceeds to step 648 where process ends.

However, if APC access permission settings have been applied to the attachment (i.e., step 636="Y"), then the APC identifier from the attachment, as well as the user identifier, may be transmitted to the sync server (step 638). Next, the system may validate the receiver by comparing the user identifier and APC identifier associated with the attachment with information that is stored on the server (step 640). If the user does not have access to view the attachment (i.e., step 642="N"), then the receiver may receive an error message that the client device for the receiver has an invalid APC identifier (step 644). Next, the attachment may be opened as an obfuscated JPEG file in a compatible viewer on the receiver's client device (step 646).

However, if user access is granted (i.e., step 642="Y"), the system may determine if file access for the JPEG file in the attachment is still available (step 650). File access may be determined using the APC identifier. If APC file access is not the most current (i.e., step 650="N"), then the server may transmit a conditional valid access code and file update link to the receiver client. The conditional access code may be used to validate whether the permissions in the container file are current (step 652). Next, a new file may be received by the receiver's client device upon selecting file update link (step 654).

However, if the APC file access is current (i.e., step 650="Y"), the server responds with a valid access code that is transmitted to the viewer (step 656). Next, the receiver's client device may check the format of one or more JPEG files that are received from the server against the registry on the receiver's client device (step 658). The Registry can include settings for applications that may be used to access the information in the JPEG file. Next, the container file may be unpacked by the receiver's client device (step 660). After unpacking the container file, the APC data in the encrypted protected portion(s) may be isolated from the rest of the file (step 662). Next, the receiver's client device decrypts the encrypted protected portion(s) with the valid APC key (step 664). Particularly, the receiver's client device may decrypt the encrypted APC data with the receiver's client device private key to retrieve the user public keys (APC key). Once the APC key is decrypted, the APC keys may be used to decrypt the encrypted protected portion(s) if the attributes in the ciphertext match the attributes in the APC keys. If the APC data is not decrypted (i.e., step 666="N"), then the obfuscated JPEG file may be displayed in a compatible viewer on the receiver client device (step 646).

However, if the APC data is successfully decrypted (i.e., step 666="Y"), then the receiver's client device may replace one or more pixel coordinates in an obfuscated region for the obfuscated JPEG file with the decrypted APC data that represent information at the same pixel coordinates that were obfuscated (step 668). Next, the JPEG file that is created with one or more replaced coordinates may be displayed as a regenerated JPEG object or image in an appropriate viewer on the receiver's authorized client device (step 670). Step 670 ends after proceeding to step 672.

Figure 7A:
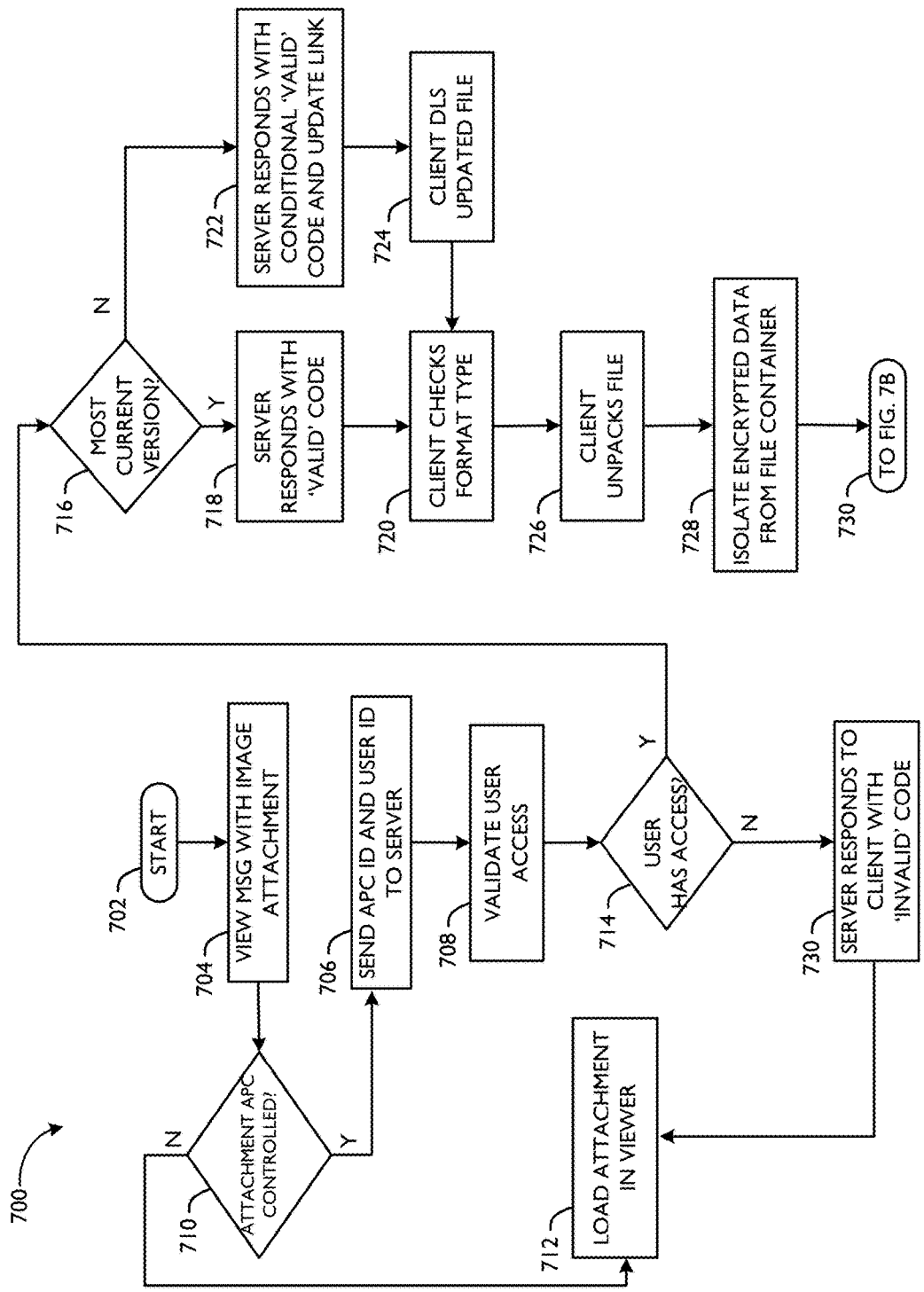
FIGS. 7A-7B show flowcharts that depict a method for utilizing a multi-region, layer-based APC process for lossy files from a receiver's perspective, according to one or more disclosed embodiments.
Figure 7B:
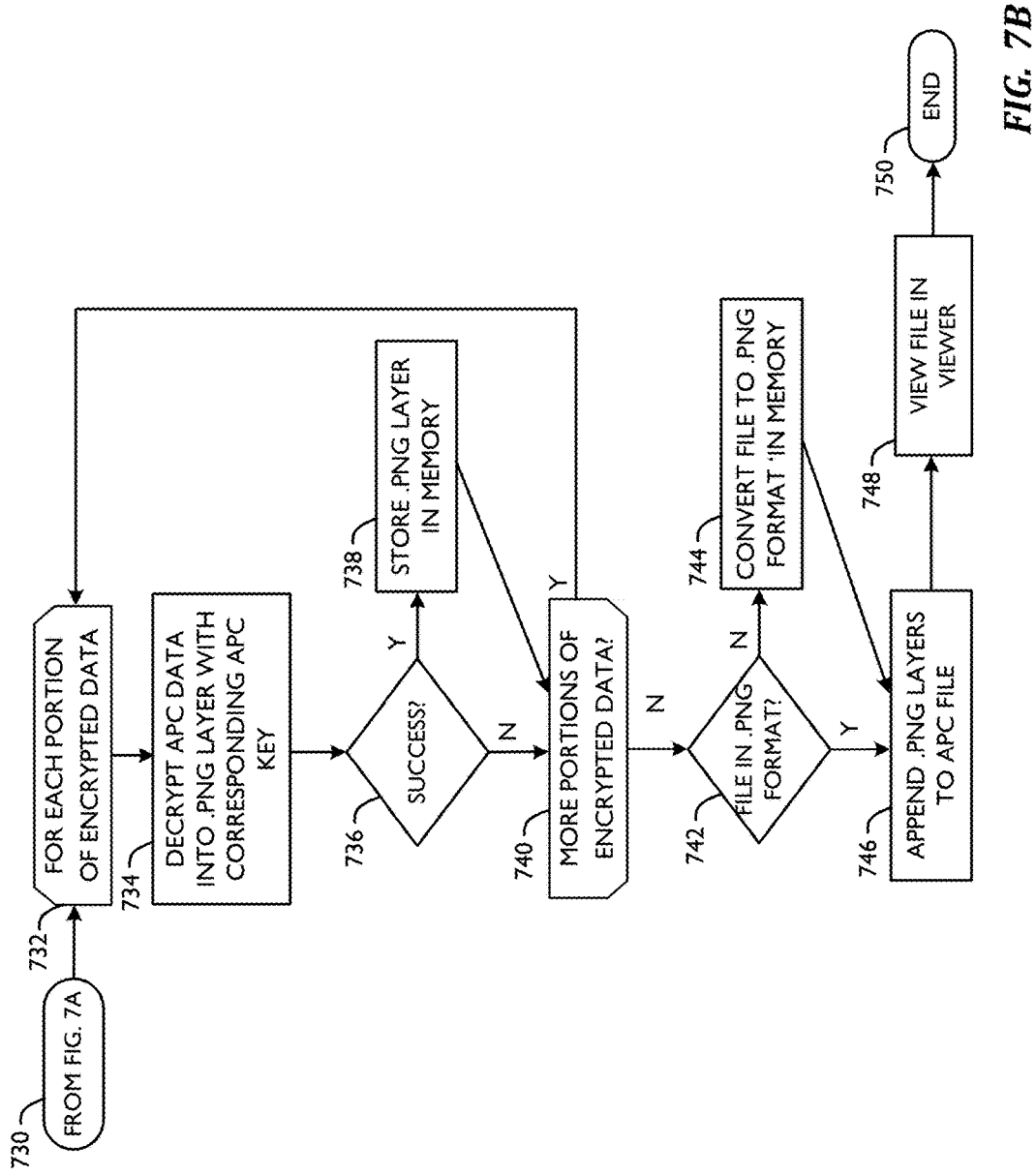

FIGS. 7A-7B show flowcharts that depict a method 700 for utilizing a multi-region, layer-based APC process for lossy files from a receiver's perspective, according to one or more disclosed embodiments. First, the method starts at step 702. In step 704, a receiver may view (e.g., in a third-party email client or a web browser) a message with an image attachment that is received, e.g., in a known lossy file format. In 710, the receiver may determine whether the attachment is APC-controlled (i.e., step 710="Y"), then the receiver may send the APC ID of the attachment and its user ID to the central communications server (step 706). However, if the receiver determines that the attachment is not APC-controlled (i.e., step 710="N"), then the receiver may simply load the attachment in the appropriate viewer application (step 712). Next, assuming the attached is APC-controlled, the server may utilize the APC ID and user ID to validate that the current user has access to see at least a portion of the attached file (step 708). If the receiver does not have access (i.e., step 714="N"), process 700 proceeds to step 730, which has the server respond to the client that it possesses an invalid code to view any of the protected contents of the attachment. The process 700 may then proceed to step 712 to load the attachment in the appropriate viewer application, allowing the recipient to see any unobfuscated or unprotected regions of the attachment (if any). If, instead the receiver does have access to view one or more protected portions of the attachment (i.e., step 714="Y"), process 700 proceeds to step 716, wherein the server may verify whether the received attachment reflects the most current version of the attachment known to the server. If the attachment does not reflect the most current version (i.e., step 716="N"), process 700 proceeds to step 722, wherein the server responds to the recipient client device with a conditional valid code and a link to the most updated version of the file. The recipient may then use the link to the updated file to download the updated version of the file (step 724), at which point the process may return to step 720. If, instead, the attachment does reflect the most current version (i.e., step 716="Y"), process 700 proceeds to step 718, wherein the server responds to the recipient client device with a valid code and a link to the most updated version of the file. Next, at step 720, the process 700 may check the format type of the attachment, e.g., so that it can apply the correct rules to unpack the attachment file and knows where in the attachment file to look for the hidden encrypted content.

At step 726, the process 700 proceeds to unpack the attachment file according to the applicable rules of the attachment's file type, as discussed above. Next, at step 728, the process may isolate the encrypted data from the attachment file's file container. For example, in the case of an image file that has encrypted content hidden in binary data formatted as PNG layers with the protected data surrounded by a transparent region co-extensive with the dimensions of the original image, step 728 may comprise the process parsing out the encrypted PNG binary layers and determining how many portions of encrypted data were packed in the attachment file. Finally, at Step 730, the process 700 may proceed to FIG. 7B for the processing of the identified individual protected encrypted portions identified in step 728.

Turning now to FIG. 7B, the process 700 continues with step 732, wherein, for each identified protected encrypted portion, the process undertakes additional processing to decrypt the portions and layer them over the original attachment file content in the appropriate locations. First, at step 734, the process 700 may decrypt the APC-protected data for a given portion using the corresponding APC key. For example, if a given protected portion is encrypted PNG layer binary data, the process 700 may decrypt the APC-protected data into a PNG layer in memory. If successful (i.e., step 736="Y"), process 700 proceeds to step 738, wherein the decrypted portion may be stored in memory at the recipient's client device and then on to step 740 to evaluate and attempt to decrypt the next encrypted portion extracted from the attachment. If not successful at decrypting the portion (i.e., step 736="N"), it is an indication that the client does not have the appropriate permission to decrypt the portion and/or there is a problem with the APC key that the client attempted to use (e.g., it may be out of date), so the process 700 proceeds to step 740, wherein it moves on to evaluate and attempt to decrypt the next encrypted portion extracted from the attachment.

The exemplary process 700 shown in FIG. 7B is directed to the specific example of an image file attachment, wherein the decrypted layers are represented in memory as PNG layers that may be layered on top of the original image file attachment content, however, the processes described herein may also apply to other file types and other multi-layered representations of the decrypted content. Thus, at step 742, the process 700 may evaluated whether the original file attachment was already in a PNG format (or, e.g., other file format that already supports multiple image layers). If the original file attachment was not already in a PNG format (i.e., step 742="N"), the process may convert the file to a PNG format (or other file format supporting multiple image layers) in memory, before proceeding to step 746. If, instead, the original file attachment was already in a PNG format (i.e., step 742="Y"), the process may proceed directly to step 746, wherein each of the PNG layers that the recipient has the authority to decrypt are appended (i.e., layered on top of) the APC file in memory, resulting in a complete multi-layered PNG binary representation of the original attachment in memory on the recipient's client device that may then be viewed in authorized viewing application (step 748). At that point, the process may end at step 750. As may now be appreciated, as the encrypted portions hidden within the document structure of the original attachment are unpacked and decrypted, only those portions that the viewer has permission to decrypt will be 'layered' on top of the corresponding obfuscated region in the original image file, while the other obfuscated regions in the original image file that the recipient does not have the permission to decrypt will simply remain obfuscated. Further, because the multi-layered PNG representation of the file is only being created in memory and interpreted such that it may be viewed in an authorized viewing application at the time of viewing, the underlying compressed image content in the original image attachment file remains unchanged (i.e., obfuscated in all areas to which the sender has applied obfuscation). Thus, if the image were to be viewed outside of an authorized viewing application or forwarded to a recipient that did not have permission to view the protected image portions, they would simply see the original obfuscated image file, e.g., a JPEG file having one or more blurred/blacked out regions of pixels.

Figure 8:
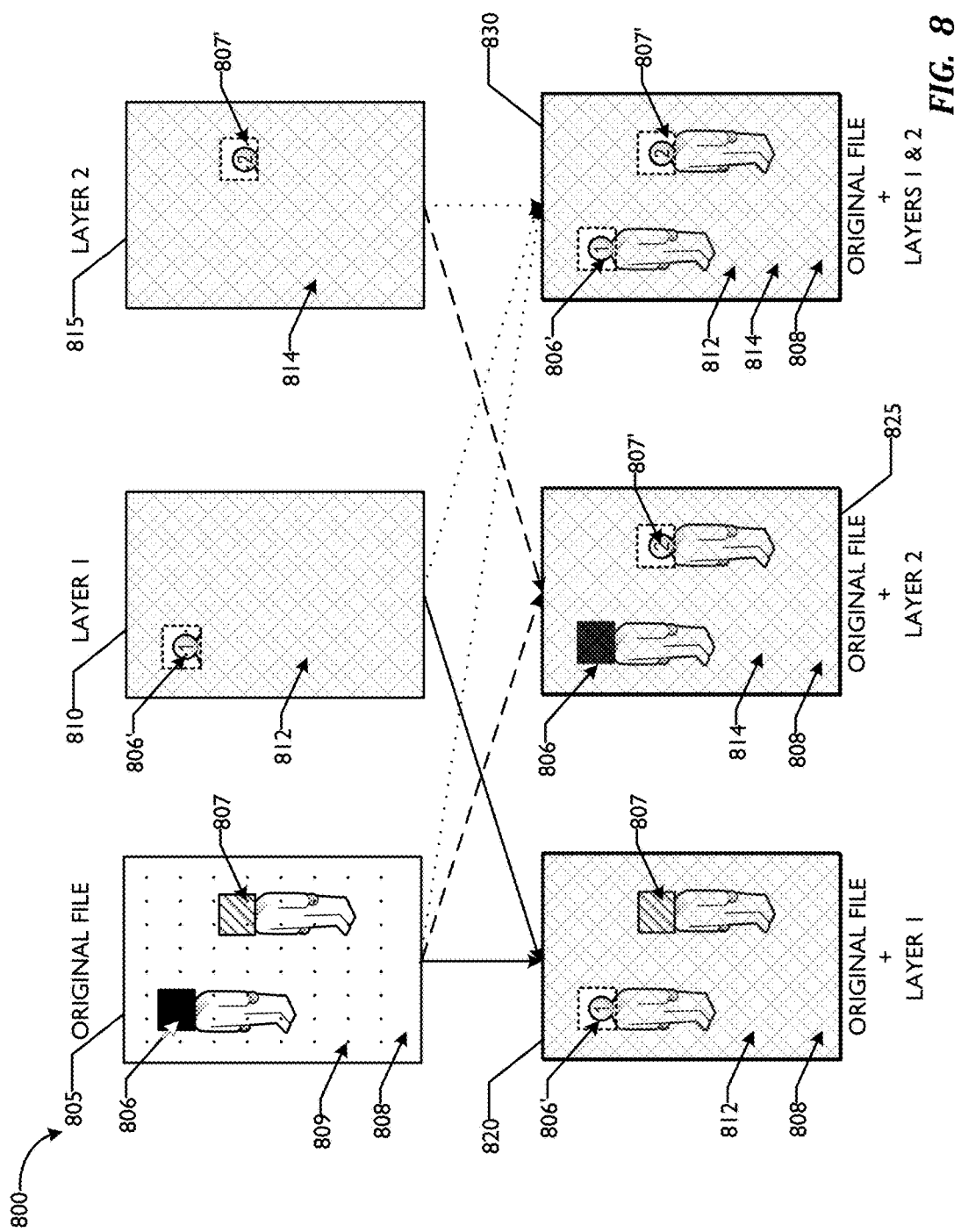
FIG. 8 shows an example of a multi-layered sub-document-level access permission setting scheme with custom recipient-based privacy settings and anchor points, according to one or more disclosed embodiments.

FIG. 8 shows an example of a multi-layered sub-document-level access permission setting scheme with custom recipient-based privacy settings and anchor points, according to one or more disclosed embodiments. Image file 805 represents a version of image file 305 previously discussed above with reference to FIG. 3A, wherein the image comprises two human subjects, whose heads have been obfuscated by the sender, for illustrative purposes. As illustrated, person '1's head has been obfuscated by a blacked out box 806, and person '2's head has been obfuscated by a diagonally-striped box 807. The background of image 805 comprises opaque pixels 808, such that transparent PNG layers may be layered over the original image file without affected the viewer's ability to view the unprotected regions of the image file, as will be discussed in greater detail below. Also present in image 805 are a series of anchor points 809 which may, e.g., be distributed evenly over the image or placed at other irregularly-repeating regions within the image. The role of anchor points 809 will be discussed in further detail below.

Image layer 810 represents a PNG layer comprising the true underlying data from the original image file corresponding to blacked out box 806, i.e., the head of person '1.' As is shown in image layer 810, the anchor points in region 806' of image layer 810 correspond to the same anchor points in blacked out box 806 from image file 805. In this way, when the recipient is creating a binary representation of a PNG layer for image layer 810, it knows how to align the decrypted content of region 806' within the overall image layer 810 so that, if layered on top of image file 805, the underlying data of the obfuscated region represented by blacked out box 806 may be placed at the correct place in the image—even if parts of the original image file 805 have been subsequently cropped or otherwise modified by a user. In other words, so long as at least two anchor points from original image file 805 exists in the region 806', the recipient can create a PNG layer image layer 810 that places the decrypted content of region 806' at the correct place in the overall image file. The remainder or the pixels in image layer 810 may be filled in with transparent pixels 812 (indicated by gray crosshatching in FIG. 8), such that, if image layer 810 is layered on top of the original image file 805, the only pixels that are 'visually overridden' by image layer 810 are those pixels within blacked out box 806, and the remainder of the pixels in image file 805 may be viewed without modification by the placement of PNG layer of image layer 810 on top of image file 805.

Image layer 815 represents a represents a PNG layer comprising the true underlying data from the original image file corresponding to diagonally-striped box 807, i.e., the head of person '2.' As is shown in image layer 815, the anchor points in region 807' of image layer 815 correspond to the same anchor points in diagonally-striped box 807 from image file 805. In this way, when the recipient is creating a binary representation of a PNG layer for image layer 815, it knows where to place the decrypted content of region 807' within the overall image layer 815 so that, if layered on top of image file 805, the underlying data of the obfuscated region represented by diagonally-striped box 807 may be placed at the correct place in the image—even if parts of the original image file 805 have been subsequently cropped or otherwise modified by a user. As with image layer 810, the remainder or the pixels in image layer 815 may be filled in with transparent pixels 814, such that, if image layer 815 is layered on top of the original image file 805, the only pixels that are 'visually overridden' by image layer 815 are those pixels within diagonally-striped box 807, and the remainder of the pixels in image file 805 may be viewed without modification by the placement of PNG layer of image layer 815 on top of image file 805.

As indicated by the solid black line arrows in FIG. 8, image representation 820 represents a combination of the original image file 805 (having the compressed obfuscated regions 806 and 807) and image layer 810 (having the decrypted content from region 806' layered on top of image file 805 at the position corresponding to blacked out box 806). As illustrated in FIG. 8, because the rest of the pixels in image layer 810 are transparent, image representation 820 appears identical to image file 805, but for the fact that the true contents of blacked out box 806 have been revealed via the layering of image layer 810 on top of image file 805 in memory when the image is displayed to the recipient in an authorized viewing application.

As indicated by the black dashed line arrows in FIG. 8, image representation 825 represents a combination of the original image file 805 (having the compressed obfuscated regions 806 and 807) and image layer 815 (having the decrypted content from region 807' layered on top of image file 805 at the position corresponding to diagonally-striped box 807). As illustrated in FIG. 8, because the rest of the pixels in image layer 815 are transparent, image representation 825 appears identical to image file 805, but for the fact that the true contents of diagonally-striped box 807 have been revealed via the layering of image layer 815 on top of image file 805 in memory when the image is displayed to the recipient in an authorized viewing application.

As indicated by the black dotted line arrows in FIG. 8, image representation 830 represents a combination of the original image file 805 (having the compressed obfuscated regions 806 and 807) with image layer 810 (having the decrypted content from region 806' layered on top of image file 805 at the position corresponding to blacked out box 806) and image layer 815 (having the decrypted content from region 807' layered on top of image file 805 at the position corresponding to diagonally-striped box 807). As illustrated in FIG. 8, because the rest of the pixels in image layers 810 and 815 are transparent, image representation 830 appears identical to image file 805, but for the fact that the true contents of blacked out box 806 and diagonally-striped box 807 have been revealed via the layering of image layers 810 and 815, respectively, on top of image file 805 in memory when the image is displayed to the recipient in an authorized viewing application.

As may now be more fully understood, the use of multiple layers for the encrypted protected portions of the original image makes the original (i.e., unobfuscated) image content easier to reconstitute. It also allows for the creation of overlapping regions and makes it easier to create separate regions. The use of layers also makes it less likely that the underlying image data becomes corrupted, because the JPEG binary byte array does not have to be repeatedly changed with each 'insertion' of decrypted content (i.e., since the layers are actually just laid over the top of the original content, rather than being reinserted into the original JPEG byte array). The use of layers to store the encrypted protected portions also makes it easier for the system to handle irregularly-shaped protected regions (e.g., hand-drawn scribble outs or scratch outs) because the system does not have to go into the JPEG byte array and replace pixel value at irregular or unpredictable places in order to match the shape of the protected regions. Rather, the true content is simply layered directly on top of the obfuscated content, with the rest of the layer filled out by transparent pixels.

EXAMPLES

The following examples pertain to further embodiments.

Example 1 is a non-transitory computer readable medium comprising computer executable instructions stored thereon that when executed cause one or more processing units to: receive an indication of a first protected portion and a second protected portion of a file of a single-layered, lossy file type; receive first and second respective access permission settings for each of the first and second protected portions; receive an indication of a first recipient for the first protected portion; receive an indication of a second recipient for the second protected portion; generate a first layer representation corresponding to the first protected portion and a second layer representation corresponding to the second protected portion; generate an edited copy of the file based on the indication of the first and the second protected portions to create an edited single-layered, lossy file; add the first and second layer representations back into the file structure of the edited single-layered, lossy file; and transmit the edited single-layered, lossy file to the first and the second recipients.

Example 2 includes the subject matter of Example 1, wherein the instructions further include instructions to cause the one or more processing units to: generate the edited single-layered, lossy file by obfuscating at least one of the first protected portion and the second protected portion.

Example 3 includes the subject matter of Example 1, wherein the first protected portion and the second protected portion are at least partially overlapping.

Example 4 includes the subject matter of Example 2, wherein the instructions to obfuscate at least one of the first protected portion and the second protected portion further comprise instructions to mask the content of the file at the first protected portion and the second protected portion, respectively.

Example 5 includes the subject matter of Example 1, wherein the instructions further include instructions to cause the one or more processing units to: encrypt at least one of the first and second protected portions based, at least in part, on the first and the second access permission settings, respectively.

Example 6 includes the subject matter of Example 1, wherein the first layer representation comprises the first protected portion of the file and a transparent region around the first protected portion that is co-extensive in dimensions with the file.

Example 7 includes the subject matter of Example 1, wherein the first layer representation is a binary representation of a single PNG layer.

Example 8 includes the subject matter of Example 7, wherein the instructions to add the first and second protected portions, associated with their respective access permission settings, back into the file structure of the edited single-layered, lossy file further comprise instructions to: insert the first and second layer representations into one or more header elements of the file's data structure.

Example 9 includes the subject matter of Example 1, wherein the edited single-layered, lossy file is configured such that the first and second layer representations are only viewable by a recipient in an authorized viewing application.

Example 10 includes the subject matter of Example 1, wherein the first and second layer representations are configured to be layered on top of the edited single-layered, lossy file when an authorized recipient views the file in an authorized viewing application.

Example 11 includes the subject matter of Example 10, wherein the file further comprises anchor points, and wherein the anchor points are configured to align the first and second layer representations with the edited single-layered, lossy file when an authorized recipient views the file in an authorized viewing application.

Example 12 is a system, comprising: a memory; and one or more processing units, communicatively coupled to the memory, wherein the memory stores instructions to configure the one or more processing units to: receive an indication of a first protected portion of a file of a single-layered, lossy file type; receive a first access permission setting for the first protected portion; receive an indication of a first recipient for the first protected portion; generate a first layer representation corresponding to the first protected portion; generate an edited copy of the file based on the indication of the first protected portion to create an edited single-layered, lossy file; add the first layer representation back into the file structure of the edited single-layered, lossy file; and transmit the edited single-layered, lossy file to the first recipient.

Example 13 includes the subject matter of Example 12, wherein the instructions are further configured to cause the one or more processing units to: generate the edited single-layered, lossy file by obfuscating the first protected portion.

Example 14 includes the subject matter of Example 12, wherein the first protected portion comprises a sub-portion of the file.

Example 15 includes the subject matter of Example 13, wherein the instructions to obfuscate the first protected portion are further configured to cause the one or more processing units to mask the content of the file at the first protected portion.

Example 16 includes the subject matter of Example 12, wherein the instructions are further configured to cause the one or more processing units to: encrypt the first protected portion based, at least in part, on the first access permission setting.

Example 17 includes the subject matter of Example 12, wherein the first layer representation comprises the first protected portion of the file and a transparent region around the first protected portion that is co-extensive in dimensions with the file.

Example 18 includes the subject matter of Example 12, wherein the first layer representation is a binary representation of a single PNG layer.

Example 19 includes the subject matter of Example 18, wherein the instructions to add the first protected portion, associated with its access permission settings, back into the file structure of the edited single-layered, lossy file further comprise instructions to: insert the first layer representation into one or more header elements of the image file's data structure.

Example 20 includes the subject matter of Example 12, wherein the edited single-layered, lossy file is configured such that the first layer representation is only viewable by a recipient in an authorized viewing application.

Example 21 includes the subject matter of Example 12, wherein the first layer representation is configured to be layered on top of the edited single-layered, lossy file when an authorized recipient views the file in an authorized viewing application.

Example 22 includes the subject matter of Example 21, wherein the file further comprises anchor points, and wherein the anchor points are configured to align the first layer representation with the edited single-layered, lossy file when an authorized recipient views the file in an authorized viewing application.

Example 23 is a computer-implemented method, comprising: receiving an indication of a first protected portion of a file of a single-layered, lossy file type; receiving a first access permission setting for the first protected portion; receiving an indication of a first recipient for the first protected portion; encrypting the first protected portion based, at least in part, on the first access permission setting and the first recipient; generating a first encrypted layer representation corresponding to the encrypted first protected portion; generating an edited copy of the file based on the indication of the first protected portion to create an edited single-layered, lossy file; adding the first encrypted layer representation, associated with its access permission settings, back into the file structure of the edited single-layered, lossy file; and transmitting the edited single-layered, lossy file to the first recipient.

Example 24 includes the subject matter of Example 23, wherein the act of generating the edited lossy file further comprises obfuscating the first protected portion.

Example 25 includes the subject matter of Example 23, wherein the first encrypted layer representation is configured to be decrypted and layered on top of the edited single-layered, lossy file when an authorized recipient views the file in an authorized viewing application.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium comprising computer executable instructions stored thereon that when executed cause one or more processing units to:

receive an indication of a first protected portion and a second protected portion of a file of a single-layered, lossy file type having first dimensions, wherein the file further comprises anchor points;

receive first and second respective access permission settings for each of the first and second protected portions;

receive an indication of a first recipient for the first protected portion;

receive an indication of a second recipient for the second protected portion;

generate a first layer representation corresponding to the first protected portion and a second layer representation corresponding to the second protected portion;

generate an edited copy of the file based on the indication of the first and the second protected portions to create an edited single-layered, lossy file;

add the first and second layer representations back into the file structure of the edited single-layered, lossy file;

crop the edited single-layered, lossy file to have dimensions different from the first dimensions; and transmit the cropped and edited single-layered, lossy file to the first and the second recipients, wherein the anchor points are configured to align the first and second layer representations at the correct positions within the cropped and edited single-layered, lossy file when an authorized recipient views the cropped and edited single-layered, lossy file in an authorized viewing application.

2. The non-transitory computer readable medium of claim 1, wherein the instructions further include instructions to cause the one or more processing units to: generate the edited single-layered, lossy file by obfuscating at least one of the first protected portion and the second protected portion.

3. The non-transitory computer readable medium of claim 1, wherein the first protected portion and the second protected portion are at least partially overlapping.

4. The non-transitory computer readable medium of claim 2, wherein the instructions to obfuscate at least one of the first protected portion and the second protected portion further comprise instructions to mask the content of the single-layered, lossy file at the first protected portion and the second protected portion, respectively.

5. The non-transitory computer readable medium of claim 1, wherein the instructions further include instructions to cause the one or more processing units to: encrypt at least one of the first and second protected portions based, at least in part, on the first and the second access permission settings, respectively.

6. The non-transitory computer readable medium of claim 1, wherein the first layer representation comprises the first protected portion of the single-layered, lossy file and a transparent region around the first protected portion that is co-extensive with the first dimensions.

7. The non-transitory computer readable medium of claim 1, wherein the first layer representation is a binary representation of a single PNG layer.

8. The non-transitory computer readable medium of claim 7, wherein the instructions to add the first and second protected portions, associated with their respective access permission settings, back into the file structure of the edited single-layered, lossy file further comprise instructions to: insert the first and second layer representations into one or more header elements of the edited single-layered, lossy file's data structure.

9. The non-transitory computer readable medium of claim 1, wherein the cropped and edited single-layered, lossy file is configured such that the first and second layer representations are only viewable by a recipient in an authorized viewing application.

10. The non-transitory computer readable medium of claim 1, wherein the first and second layer representations are configured to be layered on top of the cropped and edited single-layered, lossy file when an authorized recipient views the cropped and edited single-layered, lossy file in an authorized viewing application.

11. A system, comprising:
a memory; and
one or more processing units, communicatively coupled to the memory, wherein the memory stores instructions to configure the one or more processing units to:
receive an indication of a first protected portion of a file of a single-layered, lossy file type having first dimensions, wherein the file further comprises anchor points;
receive a first access permission setting for the first protected portion;
receive an indication of a first recipient for the first protected portion;
generate a first layer representation corresponding to the first protected portion;
generate an edited copy of the file based on the indication of the first protected portion to create an edited single-layered, lossy file;
add the first layer representation back into the file structure of the edited single-layered, lossy file;
crop the edited single-layered, lossy file to have dimensions different from the first dimensions; and
transmit the cropped and edited single-layered, lossy file to the first recipient,
wherein the anchor points are configured to align the first layer representation at the correct positions within the cropped and edited single-layered, lossy file when an authorized recipient views the cropped and edited single-layered, lossy file in an authorized viewing application.

12. The system of claim 11, wherein the instructions are further configured to cause the one or more processing units to: generate the edited single-layered, lossy file by obfuscating the first protected portion.

13. The system of claim 11, wherein the first protected portion comprises a sub-portion of the file.

14. The system of claim 12, wherein the instructions to obfuscate the first protected portion are further configured to cause the one or more processing units to mask the content of the file at the first protected portion.

15. The system of claim 11, wherein the instructions are further configured to cause the one or more processing units to: encrypt the first protected portion based, at least in part, on the first access permission setting.

16. The system of claim 11, wherein the first layer representation comprises the first protected portion of the file and a transparent region around the first protected portion that is co-extensive with the first dimensions.

17. The system of claim 11, wherein the first layer representation is a binary representation of a single PNG layer.

18. The system of claim 17, wherein the instructions to add the first protected portion, associated with its access permission settings, back into the file structure of the edited single-layered, lossy file further comprise instructions to: insert the first layer representation into one or more header elements of the edited single-layered, lossy image file's data structure.

19. The system of claim 11, wherein the edited single-layered, lossy file is configured such that the first layer representation is only viewable by a recipient in an authorized viewing application.

20. The system of claim 11, wherein the first layer representation is configured to be layered on top of the edited single-layered, lossy file when an authorized recipient views the cropped and edited single-layered, lossy file in an authorized viewing application.

21. A computer-implemented method, comprising:
receiving an indication of a first protected portion of a file of a single-layered, lossy file type having first dimensions, wherein the file further comprises anchor points;
receiving a first access permission setting for the first protected portion;
receiving an indication of a first recipient for the first protected portion;
encrypting the first protected portion based, at least in part, on the first access permission setting and the first recipient;
generating a first encrypted layer representation corresponding to the encrypted first protected portion;
generating an edited copy of the file based on the indication of the first protected portion to create an edited single-layered, lossy file;
adding the first encrypted layer representation, associated with its access permission settings, back into the file structure of the edited single-layered, lossy file;
cropping the edited single-layered, lossy file to have dimensions different from the first dimensions; and
transmitting the cropped and edited single-layered, lossy file to the first recipient, wherein the anchor points are configured to align the first layer representation at the correct positions within the cropped and edited single-layered, lossy file when the first layer representation is layered on top of the cropped and edited single-layered, lossy file.

22. The method of claim 21, wherein the act of generating the edited single-layered, lossy file further comprises obfuscating the first protected portion.

23. The method of claim 21, wherein the first encrypted layer representation is configured to be decrypted and layered on top of the cropped and edited single-layered, lossy file when an authorized recipient views the cropped and edited single-layered, lossy file in an authorized viewing application.

* * * * *